US 12,412,049 B2

(12) United States Patent
Yuan et al.

(10) Patent No.: US 12,412,049 B2
(45) Date of Patent: Sep. 9, 2025

(54) METHOD, APPARATUS AND ELECTRONIC DEVICE FOR DETERMINING WORD REPRESENTATION VECTOR

(71) Applicant: SAMSUNG ELECTRONICS CO., LTD., Suwon-si (KR)

(72) Inventors: Wenbo Yuan, Beijing (CN); Yuxing Zheng, Beijing (CN); Song Liu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 17/533,797

(22) Filed: Nov. 23, 2021

(65) Prior Publication Data

US 2022/0083745 A1     Mar. 17, 2022

Related U.S. Application Data

(63) Continuation of application No. PCT/KR2020/017766, filed on Dec. 7, 2020.

(30) Foreign Application Priority Data

Dec. 6, 2019   (CN) ......................... 201911244813.4
Jun. 29, 2020  (CN) ......................... 202010609924.7

(51) Int. Cl.
*G06F 40/53*      (2020.01)
*G06F 40/279*     (2020.01)
(Continued)

(52) U.S. Cl.
CPC ............ *G06F 40/53* (2020.01); *G06F 40/279* (2020.01); *G06F 40/47* (2020.01); *G06F 40/55* (2020.01)

(58) Field of Classification Search
CPC ........ G06F 40/53; G06F 40/47; G06F 40/279; G06F 40/55
See application file for complete search history.

(56) References Cited

U.S. PATENT DOCUMENTS 9,329,202 B2 * 5/2016 Sadeghian Marnani ...................
                                              G01N 29/30
9,384,389 B1    7/2016 Sankaranarayanan et al.
(Continued)

FOREIGN PATENT DOCUMENTS

CN    103714332 A    4/2014
CN    107608973 A    1/2018
(Continued)

OTHER PUBLICATIONS

Kim, Yoon et al., "Character-Aware Neural Language Models", Proceedings of the Thirtieth AAAI Conference on Artificial Intelligence (AAAI—16), Mar. 5, 2016, (https://www.aaai.org/ocs/index.php/AAAI/AAAI16/paper/view/12489/12017). (9 pages total).
(Continued)

*Primary Examiner* — Richemond Dorvil
*Assistant Examiner* — Ethan Daniel Kim
(74) *Attorney, Agent, or Firm* — Sughrue Mion, PLLC

(57) ABSTRACT

Embodiments of the present disclosure provide a method, an apparatus and an electronic device for determining a word representation vector, and a computer-readable storage medium, which belong to a field of processing natural languages. The method includes obtaining a set of glyph units of a text; obtaining a context vector of the text based on the set of glyph units; and predicting next word of the text based on the context vector. The method for determining the word representation vector of the present disclosure can effectively obtain a corresponding set of glyph units even for hieroglyphics in which hyperbolic characters are prone to appear or languages evolved from the hieroglyphics, thereby (Continued)

improving an accuracy of determining the word representation vector.

18 Claims, 24 Drawing Sheets

(51) Int. Cl.
    *G06F 40/47*     (2020.01)
    *G06F 40/55*     (2020.01)

(56) References Cited

U.S. PATENT DOCUMENTS

| | | | |
|---|---|---|---|
| 2006/0069992 A1* | 3/2006 | Hodder | G06K 15/1827 715/265 |
| 2010/0106481 A1 | 4/2010 | Lo | |
| 2011/0274354 A1 | 11/2011 | Nijemcevic | |
| 2014/0093161 A1 | 4/2014 | Oda | |
| 2014/0126812 A1 | 5/2014 | Chulinin et al. | |
| 2014/0176564 A1 | 6/2014 | Tang et al. | |
| 2015/0178265 A1* | 6/2015 | Anderson | H04N 21/44226 704/9 |
| 2018/0293228 A1* | 10/2018 | Tarakji | G06F 40/295 |
| 2019/0138606 A1 | 5/2019 | Tu et al. | |
| 2020/0004819 A1* | 1/2020 | Indenbom | G06N 7/01 |

FOREIGN PATENT DOCUMENTS

| | | |
|---|---|---|
| CN | 109902307 A | 6/2019 |
| CN | 109992788 A | 7/2019 |
| CN | 110263122 A | 9/2019 |
| CN | 110334357 A | 10/2019 |
| KR | 10-2014-0056260 A | 5/2014 |

OTHER PUBLICATIONS

International Search Report (PCT/ISA/210) issued Mar. 9, 2021 by the International Searching Authority in counterpart International Patent Application No. PCT/KR2020/017766.

Written Opinion (PCT/ISA/237) issued Mar. 9, 2021 by the International Searching Authority in counterpart International Patent Application No. PCT/KR2020/017766.

Communication dated Jun. 27, 2025 issued by the China National Intellectual Property Administration in Chinese Patent Application No. 202010609924.7.

\* cited by examiner

METHOD, APPARATUS AND ELECTRONIC DEVICE FOR DETERMINING WORD REPRESENTATION VECTOR

CROSS-REFERENCE TO RELATED APPLICATIONS

This application is a bypass continuation application of International Patent Application No. PCT/KR2020/017766, filed on Dec. 7, 2020, which claims priority from Chinese Patent Application No. 201911244813.4 filed on Dec. 6, 2019, and Chinese Patent Application No. 202010609924.7 filed on Jun. 29, 2020, in the Chinese Property Office, the disclosures of which are incorporated herein by reference in their entireties.

BACKGROUND

1. Field

The disclosure relates to a technical field of processing natural languages. Specifically, this disclosure relates to a method, apparatus, and electronic device for determining a word representation vector.

BACKGROUND ART

2. Description of the Related Art

In the field of processing natural languages, a method of determining word representation vectors to obtain the semantics of words has received a widespread attention in recent years. The determination of word representation vectors can be used to implement various tasks in natural language processing, such as text summarization, machine translation, image annotation, etc. For example, given the previous text, the next word can be predicted.

In the process of determining the word representation vector, the word representation vector is usually determined based on character representation vectors of characters in the given text, and a related method of determining the word representation vector needs to be optimized.

SUMMARY

According to an aspect of the disclosure, a method for inputting text on an electronic device, may include: obtaining at least one word from a user input; obtaining a set of glyph units of the at least one word; obtaining a word representation vector of the at least one word based on the set of glyph units; and providing a predictive word or a predictive character corresponding to the word representation vector.

The obtaining the set of glyph units of the at least one word may include: splitting the at least one word to obtain at least one character; splitting at least one character to obtain at least one glyph unit; and obtaining the set of glyph units based on the at least one glyph unit.

The obtaining the word representation vector of the at least one word based on the set of glyph units may include: obtaining a glyph unit feature vector of the set of glyph units; and obtaining the word representation vector of the at least one word based on the glyph unit feature vector.

The obtaining the word representation vector of the at least one word based on the glyph unit feature vector may include: obtaining a character representation vector corresponding to at least one character in the at least one word based on the glyph unit feature vector; and obtaining the word representation vector of the at least one word based on the character representation vector corresponding to the at least one character of the at least one word.

The obtaining the character representation vector corresponding to the at least one character in the at least one word based on the glyph unit feature vector may include: obtaining a first character feature vector of at least one character in the at least one word; obtaining a second character feature vector corresponding to the at least one character in the at least one word based on the glyph unit feature vector; and obtaining the character representation vector corresponding to the at least one character based on the first character feature vector and the second character feature vector.

The obtaining the first character feature vector of the at least one character in the at least one word may include: looking up the first character feature vector corresponding to the at least one character in the at least one word; and setting the first character feature vector to a preset character feature vector when the first character feature vector corresponding to the at least one character is not found in a vocabulary database.

The obtaining the word representation vector of the at least one word based on the character representation vector corresponding to the at least one character in the at least one word may include: obtaining a first word feature vector of the at least one word; obtaining a second word feature vector of the at least one word based on the character representation vector corresponding to the at least one character; and obtaining the word representation vector of the at least one word based on the first word feature vector and the second word feature vector.

The obtaining the first word representation vector of the at least one word may include: looking up the first word feature vector corresponding to the at least one word; and setting the first word feature vector to a preset word feature vector when the first word feature vector corresponding to the at least one character is not found in the vocabulary database.

The obtaining the second character feature vector corresponding to the at least one character in the at least one word based on the glyph unit feature vector may include: determining a weight coefficient of a glyph unit corresponding to the at least one character in the at least one word; and obtaining the second character feature vector based on the weight coefficient of the glyph unit and the glyph unit feature vector corresponding to the at least one character in the at least one word.

The determining the weight coefficient of the glyph unit corresponding to the at least one character in the at least one word may include: determining an inner product of the glyph unit feature vector of the glyph unit of the at least one character and the first character feature vector to obtain an initial glyph unit weight of the glyph unit; and determining a glyph unit weight coefficient of the glyph unit of the at least one character based on the initial glyph unit weight.

The obtaining the character representation vector corresponding to the at least one character based on the first character feature vector and the second character feature vector may include: performing linear mapping calculation on the first character feature vector to obtain a first character weight coefficient of the first character feature vector; obtaining a second character weight coefficient of the second character feature vector based on the first character weight coefficient; and obtaining the character representation vector of the at least one character based on the first character weight coefficient, the first character feature vector, the second character weight coefficient, and the second character feature vector.

The obtaining the second word feature vector of the at least one word based on the character representation vector corresponding to the at least one character may include: determining an inner product of the character representation vector of the at least one character in the at least one word and the first character feature vector to obtain an initial character weight of the at least one character; obtaining character weight coefficient of at least one character based on the initial character weight; and obtaining the second word feature vector of the at least one word based on the character weight coefficient of at least one character and the character representation vector.

The obtaining the word representation vector of the at least one word based on the first word feature vector and the second word feature vector may include: performing linear mapping calculation on the first word feature vector to obtain a first word weight coefficient of the first word feature vector; obtaining a second word weight coefficient of the second word feature vector based on the first word weight coefficient; and obtaining the word representation vector of the at least one word based on the first word weight coefficient, the first word feature vector, the second word weight coefficient, and the second word feature vector.

According to another aspect of the disclosure, an electronic device may include: a memory configured to store instructions; and a processor configured to execute the instructions to: obtain at least one word from a user input; obtain a set of glyph units of the at least one word; obtain a word representation vector of the at least one word based on the set of glyph units; and provide a predictive word or a predictive character corresponding to the word representation vector.

The processor may be further configured to: obtain a glyph unit feature vector of the set of glyph units; obtain a character representation vector corresponding to at least one character in the at least one word based on the glyph unit feature vector; and obtain the word representation vector of the at least one word based on the character representation vector.

The processor may be further configured to: obtain a first character feature vector of at least one character in the at least one word; obtain a second character feature vector corresponding to the at least one character in the at least one word based on the glyph unit feature vector; and obtain the character representation vector corresponding to the at least one character based on the first character feature vector and the second character feature vector.

The processor may be further configured to: obtain a first word feature vector and a second word feature vector of the at least one word based on the character representation vector corresponding to the at least one character; and obtain the word representation vector of the at least one word based on the first word feature vector and the second word feature vector.

The processor may be further configured to: set the first word feature vector to a preset word feature vector when the first word feature vector corresponding to the at least one character is not found in a vocabulary database; determine a weight coefficient of the glyph unit corresponding to the at least one character in the at least one word; and obtain the second character feature vector based on the weight coefficient of the glyph unit and the glyph unit feature vector corresponding to the at least one character in the at least one word.

The processor may be further configured to: determine an inner product of the glyph unit feature vector of the glyph unit of the at least one character and the first character feature vector to obtain an initial glyph unit weight of the glyph unit; and determine a glyph unit weight coefficient of the glyph unit of the at least one character based on the initial glyph unit weight.

According to another aspect of the disclosure, there is provided a non-transitory computer-readable storage medium storing a program that is executable by one or more processor to perform a method for inputting text on an electronic device. The method may include: obtaining at least one word from a user input; obtaining a set of glyph units of the at least one word; obtaining a word representation vector of the at least one word based on the set of glyph units; and providing a predictive word or a predictive character corresponding to the word representation vector.

The above method of determining the word representation vector obtains the word representation vector through the set of glyph units of the text, and can effectively obtain a corresponding set of glyph units even for hieroglyphics in which hyperbolic characters are prone to appear or languages evolved from the hieroglyphics, thereby improving an accuracy of determining the word representation vector.

Furthermore, the set of glyph units is introduced to sequentially extract and fuse three or more levels of features, such as glyph units, characters and words, so that the finally resulted word representation vector contains richer semantic features and improves the accuracy of the word representation vector.

Furthermore, for characters beyond the vocabulary (CBV) or words beyond the vocabulary (WBV) that are difficult to look up, they may be split into glyph units, and the resulted glyph units can still include valid semantic information, thereby further improving the accuracy of determining the word representation vector.

Furthermore, when fusing the first character feature vector and the second character feature vector, or fusing the first word feature vector and the second word feature vector, it may first obtain the gating weights through linear mapping, or obtain character feature weights by using cosine similarity, and then obtain the weighted sum of the first character feature vector and the second character feature vector or the weighted sum of the first word feature vector and the second word feature vector based on the gating weights or the character feature weights, which can effectively obtain the semantic information that is most relevant to the meaning of the character or the meaning of the word, thereby further improving the accuracy of determining the word representation vector.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
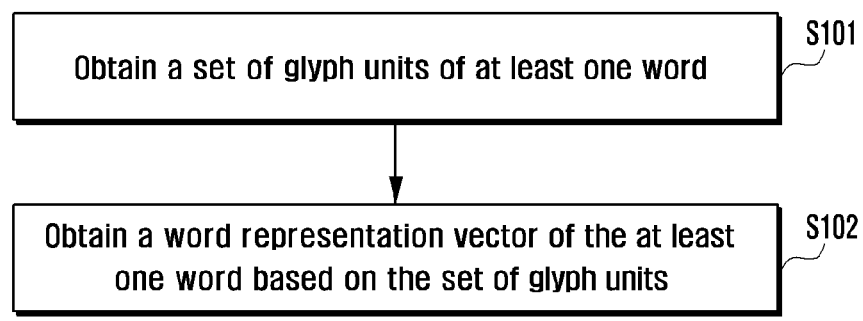
FIG. 1 illustrates a schematic flowchart of a method for determining a word representation vector according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Those skilled in the art should understand that the singular forms "a", "an", "said" and "the" include plural references unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Application Scenario: Input Method

Hieroglyphics and languages evolved from hieroglyphics, which include Chinese, Japanese, etc. are widely used in the world, and so do hieroglyphic input methods.

A language model may be used in conjunction with an input method for an electronic device. For the input method, the language model may be used to predict what word the user wants to enter as the next word, correct a wrong sentence typed by the user, and list corresponding sentence candidates when an input sequence is ready, etc. The language model deployed in a terminal device can provide users with a quick input response, and also can protect user privacy well and save network communication costs, thereby improving the user experience.

A statistical language model calculates the probability of the next word based on a statistical information of a corpus.

A neural network language model in the related art includes a word representation module, an encoder and an output layer.

The word representation module provides a word representation vector for each input word.

If the word representation module cannot accurately represent semantics, the context vector generated by the encoder will lose some important information, which leads to the neural language model predicting the wrong word regardless of the performance of the encoder and the output layer. Therefore, the performance of the neural language model depends largely on the word representation module.

(1) A feedforward neural network language model in the related art may use a word representation module to perform a simple table lookup operation. This operation finds a corresponding word representation vector in a pre-stored word representation vector vocabulary based on input words. The feedforward neural network language model may use a feedforward neural network, as an encoder, to encode a word representation vector sequence corresponding to the input word sequence into a fixed-length context vector. The context vector generated by the encoder is fed into an output layer of the feedforward neural network language model as input, and the output layer calculates the probability that each word in the vocabulary may appear in the next position through linear operation and normalization, and then predicts the word to be placed at the next position.

(2) A cyclic neural network language model in the related art may use the same word representation module as the feedforward neural network model, which refers to a simple table lookup for obtaining the word representation vector corresponding to the current word. The cyclic neural network language model may use a recurrent neural network (RNN) as an encoder. In comparison to the feedforward neural network, the recurrent neural network has more powerful coding capabilities. The context vectors generated by the recurrent neural network encoding have better quality than the context vectors generated by using the feedforward neural networks. The output layer of the recurrent neural network is the same as the language model of the feedforward neural network.

(3) A character-level Convolutional Networks (charCNN)—in the related art may receive an input word and may obtain a conditional probability of the next word based on a context vector.

1) When the input words are words beyond the vocabulary (WBVs) that are not stored in the vocabulary, the word representation module of the feedforward neural network language model and the recurrent neural network language model cannot generate effective word representation vectors, the performance of the entire language model becomes degraded. The word representation module of the charCNN-based neural network language model may calculate an effective word representation vector according to the character representation vector, thereby solving the problem of WBVs to some extent. However, when the input words are composed of characters beyond the vocabulary (CBVs) that are not stored in the character list, the word representation module of the charCNN-based neural network language model may not generate accurate and effective word representation vectors, that is, it is invalid character and word representation. However, for hieroglyphic languages (such as Chinese), there are a lot of words (the number of words in Chinese is more than 91000), in this case, CBVs are inevitable. Therefore, when the charCNN-based language model deals with the hieroglyphic language, there will be a problem that it cannot process the WBV composed of CBVs.

For example, when the word is a WBV (e.g., the word "蒹葭"), the lookup table operation will return an invalid feature vector, since the feature vector corresponding to the character of the word cannot be found in the character list, the matrix resulting from the concatenation is an invalid matrix, an invalid character-level feature is obtained through convolution operation, and the invalid character and word representation is finally obtained, that is, invalid word representation vector, the charCNN outputs invalid word representation, and at this time, the language model often cannot predict correctly the next word, since it cannot get any useful information from the word representation. Besides for "蒹葭", there are many similar WBVs, such as "憎嫕".

2) The word representation module of the charCNN-based language model generates the corresponding word representation vector through the convolution operation. For hieroglyphic languages such as Chinese, the length of a word is very short (usually only including one or two characters), and the convolution operation is not suitable for handling such short sequences. In addition, for hieroglyphic languages, the charCNN extracts semantics from characters. However, for hieroglyphic languages such as Chinese, its characters already have rich semantic information. In this case, it is not necessary to use charCNN to extract semantic information from the combination of characters.

Most hieroglyphics are very short, but the charCNN aims to process long sequences like English words. For example, the English word "preprocess" consists of 10 characters, while the Chinese "预处理" consists of only 3 characters. Therefore, many feature spaces in the feature matrix obtained by concatenation are not used, resulting in a waste of resources.

The convolution operation in the charCNN is designed to extract high-level features from a combination of base elements. However, unlike English characters, hieroglyphic characters are already high-level features. For example, character embedding of "预" already contains the meaning of "precede". While for English, the meaning of "precede" needs to be extracted from "pre" by convolution operation.

3) For hieroglyphic languages and languages evolved from hieroglyphics, such as Chinese, each word is composed of some independent components—a glyph unit (which can be called character), and some glyph units themselves also have rich semantic information, but none of above language models takes this into account.

4) For hieroglyphic languages or languages evolved from hieroglyphics, such as Chinese, characters in a word make different semantic contribution (e.g., "犬" (dog) makes largest semantic contribution to word "斗牛犬" (bulldog)), but none of above language models treats this language phenomenon specially.

Characters in one word make different semantic contributions, but charCNN may not treat them differently. For example, "犬" (dog) makes more semantic contribution to word "斗牛犬" (bulldog) than "斗" (fight), but the charCNN processes them using same operation.

Therefore, the word representation module of the charCNN-based language model cannot accurately encode the semantic information of words.

When the input word is composed of characters that are not included in the character list or at least one character of the word is not included in the character list, the charCNN will output an invalid word representation vector, for example, it may not contain any useful information.

For certain hieroglyphics, it is inevitable that some characters are not included in the character list. For example, the number of Chinese characters exceeds 91,000. Since the storage capacity in a terminal device (such as mobile phone, pad, etc.) is limited, the data volume of the character list cannot be too large. There are always some new characters on social networks, many of which are newly created, so they cannot be found in any existing character list; some characters are rare and there is not enough data to train them, so they are often excluded from the character list.

When the input word is composed of characters that are not included in the character list (i.e., character table), the lookup table operation (i.e., table lookup operation) will return an invalid feature vector (also called as invalid feature embedding), since the feature vector corresponding to the character of the word cannot be found in the character list, the matrix obtained by the concatenation is an invalid matrix, and the invalid character-level features (also called as invalid character feature vector) are obtained through the convolution operation, and the invalid word represent vector is finally obtained, that is, invalid character and word representation. When the charCNN outputs an invalid word representation vector, the language model often cannot correctly predict the next word at this time since it cannot obtain any useful information from the vocabulary. If some characters of the input word are not included in the character list, the word representation vectors of the characters that are not included in the character list are invalid feature vectors, which cause the resulting word representation vectors to be inaccurate.

Accordingly, the charCNN-based language model in the related art may not be suitable for pictographic language.

In an embodiment of the present disclosure, a hierarchical word representation-based neural language model is provided for processing hieroglyphics such as Chinese.

1. The language model in an embodiment of the present disclosure takes into account the glyph units that constitute a single character, and these glyph units are introduced into the word representation module. It may improve the quality of the word representation vector generated by the word representation module, meanwhile, and may solve the problem that the word representation vector generated by the word representation module is invalid due to a WBV composed of CBVs.

2. the language model provided herein, of which the word representation module uses a hierarchical network structure to implement hierarchical word representation, and uses a gated feature fusion (GFF) method to fuse or combine the glyph unit-, character-, and word-level feature layer by layer. This network structure fits with the way of making up word in hieroglyphic languages (a character is composed of glyph units, and then a word is composed of characters), so compared with the charCNN-based word representation module, such hierarchical word representation module provided in the language model is more suitable for processing pictographic languages, such as Chinese.

3. For hieroglyphic languages or languages evolved from hieroglyphics, some glyph units themselves also have rich semantic information.

4. The word representation module of the language model may use an attention-based feature extractor (ABFE). The ABFE may extract information of characters that are more relevant to the meaning of the words from the characters that make up the word, weaken or even ignore irrelevant characters (for example, in the word "斗牛犬" (bulldog), this extraction method will focus on extracting the semantic information contained in the character "犬" (dog), and appropriately weaken the information of characters "斗" (fight) and "牛" (bull)).

One or more embodiments of the present disclosure provide a hierarchical word representation method involving glyph unit information, which introduces glyph unit information, and improves the quality of the word representation vector generated by the word representation module through extracting features of glyph units or sequentially extracting and fusing glyph unit-level feature, character-level feature and word-level feature, thereby improving the performance of the entire language model.

The following describes in detail the technical solutions of the present disclosure and how the technical solutions of the present disclosure solve the above technical problems with specific embodiments. The following specific embodiments may be combined together, and the same or similar concepts or processes may not be repeated in some embodiments. The embodiments of the present disclosure will be described below with reference to the drawings.

FIG. 1 illustrates a schematic flowchart of a method for determining a word representation vector according to an embodiment of the present disclosure. As shown in FIG. 1, the method may include the following steps.

Step S101: a set of glyph units of at least one word is obtained.

In a specific embodiment, at least one word may be obtained, at least one word includes at least one character, and one character includes at least one glyph unit.

The glyph unit in this disclosure refers to a basic unit having semantic meaning in the glyph structure of the character in the text.

In this disclosure, each character is correspondingly provided with a fixed splitting manner. Based on the fixed splitting manner of each character, all glyph structures of at least one character may be split to obtain at least one corresponding glyph unit.

Taking the character "进" as an example, there is only one way to split the character "进", that is, the character "进" is split into "辶" and "井", and the whole character "进" is completely split without any remaining part.

At least one character of at least one word may be split to obtain a set of glyph units of at least one word, and a type of text may be correspondingly split to obtain a set of glyph units, and the set of glyph units includes at least one glyph unit.

Step S102: a word representation vector of the at least one word is obtained based on the set of glyph units.

Wherein, the word representation vector is a vector representing the semantics of the corresponding word. In this embodiment, a glyph unit feature vector corresponding to the set of glyph units is obtained based on the set of glyph units; and a corresponding word representation vector is obtained based on the glyph unit feature vector.

In the other embodiment, the word representation vector may be obtained by combining the glyph unit feature vector with a first character feature vector of the corresponding character; and the word representation vector may also be obtained by combining the character representation vector with a first word feature vector of the corresponding word, the specific manner of obtaining the word represent vector will be set forth in detail below.

In the above method of determining the word representation vector, the word representation vector may be obtained through the set of glyph units of the text. Even for hieroglyphics or languages evolved from the hieroglyphics that often have CBVs, the corresponding set of glyph units may be effectively obtained, so as to improve the accuracy of determining the word representation vector.

In an implementation of the embodiment of the present disclosure, the obtaining the set of glyph units of at least one word in step S101 may include: (1) splitting the at least one word to obtain at least one character; (2) splitting at least one character to obtain at least one glyph unit; and obtaining the set of glyph units based on the at least one glyph unit.

Particularly, a preset network model may be used to split at least one word into at least one character, and then to split the at least one character according to the character list to obtain respective glyph units that constitute the character.

For example, the word "花草" may be split into two characters "花" and "草". For the character "花", it may be split into two glyph units "艹" and "化". For the character "草", it may be split into two glyph units "艹" and "早".

As another example, the word "蒹葭" may be split into two characters "蒹" and "葭". For the character "蒹", it may be split into two glyph units "艹" and "兼". For the character "葭", it may be split into two glyph units "艹" and "叚". Even if the word "蒹葭" is a WBV, but the split "艹" still contains valid semantic information: "蒹葭" refers to a herbaceous plant, and "艹" includes the meaning of herbaceous plant.

In the specific embodiment, various glyph units are included in the character list.

In the above embodiment, the glyph unit table may be set to include all the glyph units constituting the Chinese character, and for any word, it may be split into glyph units, regardless of whether a character in the word is a CBV, or it is difficult to look up, the glyph units that constitute the word can always be found in the glyph unit table, and the obtained glyph units may still include valid semantic information, thereby improving the accuracy of determining the word representation vector.

Figure 2:
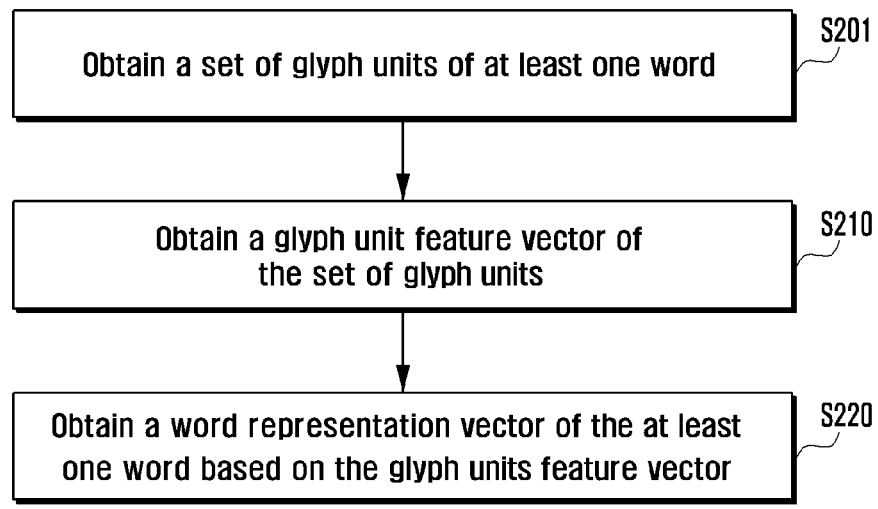
FIG. 2 illustrates a schematic flowchart of a method for determining a word representation vector according to an embodiment of the present disclosure.

In an implementation of the embodiment of the present disclosure, as shown in FIG. 2, the obtaining the word representation vector of the at least one word based on the set of glyph units in step S102 may include: Step S201: obtaining a glyph unit feature vector of the set of glyph units; and Step S210: obtaining a word representation vector of the at least one word based on the glyph unit feature vector.

Specifically, for a glyph unit in the glyph unit table, it may preset a corresponding glyph unit feature vector, and may directly look up a glyph unit feature vector corresponding to at least one glyph unit in the set of glyph units.

Figure 3:
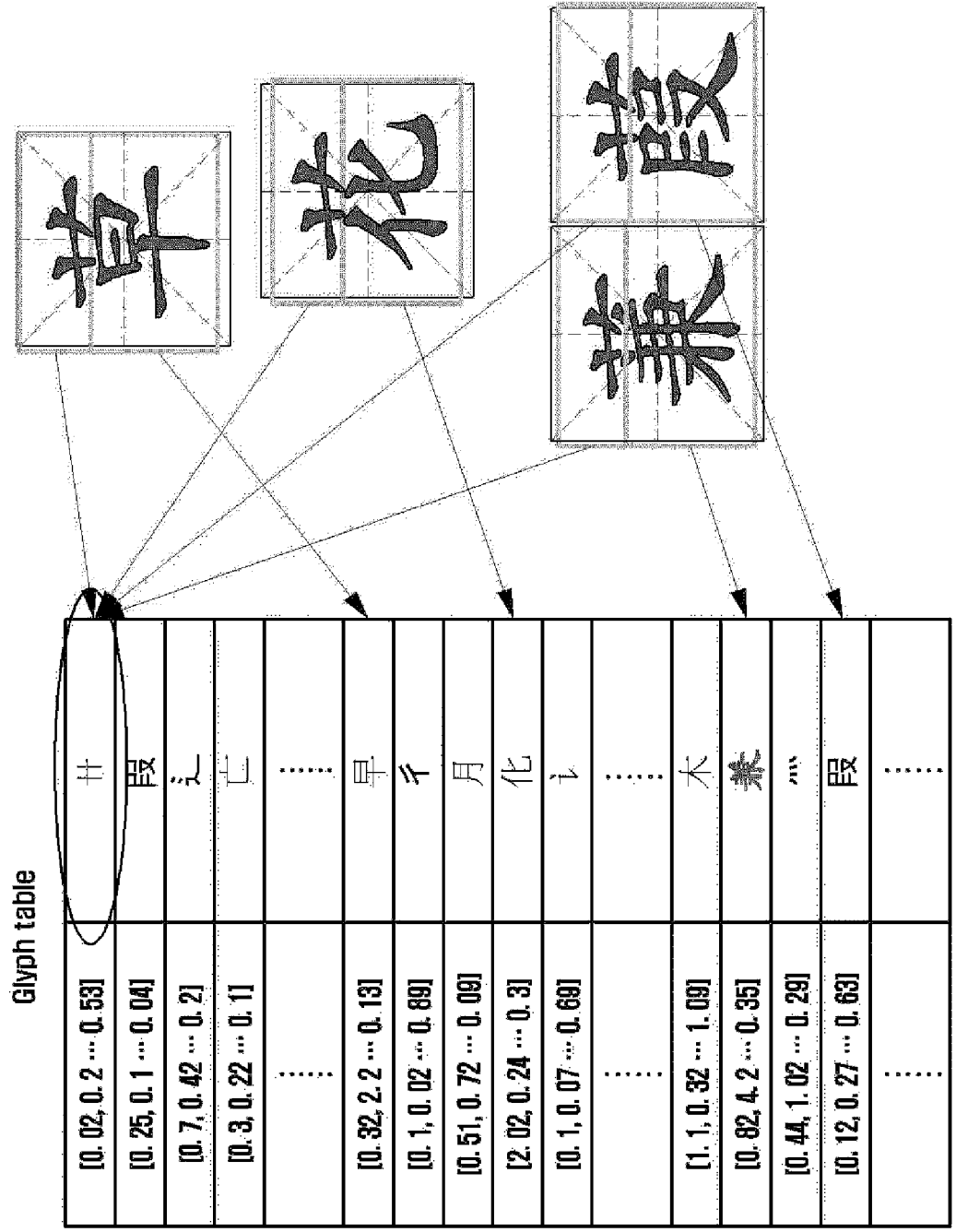
FIG. 3 illustrates a schematic diagram of looking up a glyph unit feature vector based on a glyph unit table according to an embodiment of the present disclosure.

Specifically, a glyph unit table may be set such that multiple glyph units and the glyph unit feature vector corresponding to respective glyph unit are provided as shown in FIG. 3. For example, the character "草" shown in FIG. 3 includes two glyph units "艹" and "早". The glyph unit feature vector corresponding to "艹" and the glyph unit feature vector corresponding to "早" may be looked up.

Specifically, the character representation vector of at least one character corresponding to the set of glyph units may be obtained directly based on the glyph unit feature vector, and then the word representation vector may be obtained based on the character representation vector. A first character feature vector of at least one character corresponding to the set of glyph units may be looked up, and the character representation vector may be obtained based on the first character feature vector and the glyph unit feature vector. The word representation vector may be obtained based on the character representation vector. After the character representation vector is obtained, a first word feature vector of the corresponding word may be obtained, and the second word feature vector of the corresponding word may be determined based on the character representation vector. The resulting word representation vector may be obtained based on the first word feature vector and the second word feature vector. The specific process of obtaining the word representation vector will be described in detail below.

The specific process of obtaining the word representation vector will be further described below with reference to the drawings and specific embodiments.

In an embodiment, the obtaining the word representation vector of the at least one word based on the glyph unit feature vector in step S220 may include the following steps.

(1) A character representation vector corresponding to at least one character in the at least one word is obtained based on the glyph unit feature vector.

Specifically, for any character in at least one word, at least one glyph unit constituting the one character may be obtained, and then a glyph unit feature vector of the glyph unit constituting the one character may be determined. The character representation vector of the one character may be obtained by calculating a weighted sum of the glyph unit feature vector of at least one glyph unit of the one character.

(2) The word representation vector of the at least one word is obtained based on the character representation vector corresponding to at least one character of the at least one word.

Specifically, for any word in at least one word, a weighted sum of the character representation vector of at least one character constituting the one word may be calculated to obtain the word representation vector of the one word.

Figure 4A:
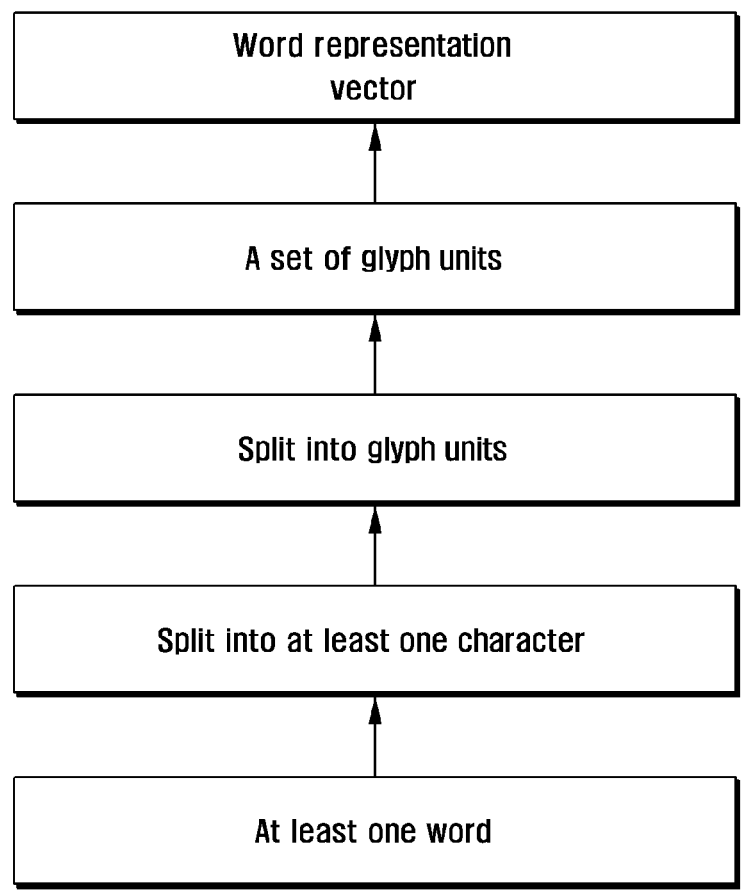
FIG. 4A illustrates a schematic flowchart of obtaining a word representation vector of a word according to an embodiment of the present disclosure.

As shown in FIG. 4A, for at least one word, the at least one word is split into at least one character, and the at least one character is split into a set of glyph units, thereby obtaining a set of glyph units for the at least one word, and then obtaining a corresponding word representation vector based on the set of glyph units.

In another embodiment, the obtaining the character representation vector corresponding to at least one character in the at least one word based on the glyph unit feature vector may include the following steps.

Operation A of obtaining obtain a first character feature vector of at least one character in the at least one word.

Specifically, for a preset character list, any word may be provided with a corresponding first character feature vector, and it may directly look up the first character feature vector respectively corresponding to at least one character in at least one word.

In a specific implementing process, operation A of the obtaining a first character feature vector of at least one character in the at least one word may include: operation A1 of looking up the first character feature vector corresponding to at least one character in the at least one word; and operation A2 of setting a preset character feature vector as the first character feature vector when the corresponding first character feature vector is not found.

Wherein, the preset character feature vector may be a vector set for CBVs of which the corresponding first character feature vector cannot be found, and the preset character feature vector may be a vector representing all CBVs, for example, which is represented with "unknown character feature vector", if the corresponding first character feature vector is not found, the preset character feature vector is used as the first character feature vector of the character.

Operation B of obtaining a second character feature vector corresponding to at least one character in the at least one word based on the glyph unit feature vector.

Specifically, a glyph unit weight coefficient of at least one glyph unit constituting a character may be determined, and the corresponding glyph unit feature vector is fused or combined based on the glyph unit weight coefficient to obtain a corresponding second character feature vector.

For example, for a character "进" including two glyph units "辶" and "井", the glyph unit feature vector corresponding to "辶" and the glyph unit feature vector corresponding to "井" may be respectively obtained. The two glyph unit feature vectors are weighted and summed to obtain a second character feature vector of "进".

Operation B of the obtaining a second character feature vector corresponding to at least one character in the at least one word based on the glyph unit feature vector may include the following steps.

Operation B1 of determining a glyph unit weight coefficient corresponding to at least one character in the at least one word.

Specifically, the determining the glyph unit weight coefficient corresponding to at least one character in the at least one word may include: ① determining the inner product of the glyph unit feature vector of the glyph unit of at least one character and the first character feature vector of the corresponding character to obtain an initial glyph unit weight of the glyph unit; ② based on the initial glyph unit weight, determining the glyph unit weight coefficient of the corresponding glyph unit.

In the specific implementing process, the inner product of the glyph unit feature vector of a glyph unit and the first character feature vector of the character may be obtained. That is, the glyph unit feature vector and the first character feature vector are taken to the inner product to obtain an initial glyph unit weight of the glyph unit.

Take "进" as an example, the glyph unit feature vector of "辶" and the first character feature vector of "进" are taken to the inner product to obtain an initial glyph unit weight of "辶", for example, resulting 8; the glyph unit feature vector of "井" and the first character vector of "进" are taken to the inner product to obtain an initial glyph unit weight of "井", for example, resulting 2; based on a ratio of the initial glyph unit weight of "辶" and the initial glyph unit weight of "井", it may respectively calculate the glyph unit weight coefficients of "辶" and "井".

It can be understood that the sum of the glyph unit weight coefficients of multiple glyph units in one character is 1, that is, the weights of initial glyph units are normalized to obtain the character weight coefficient of "辶" of 0.8 and the character weight coefficient of "井" of 0.2.

In the above embodiment, the initial glyph unit weight of the glyph unit is determined by taking the inner product. In other embodiments, the initial glyph unit weight of the glyph unit may also be determined by other ways, for example, the way of the product may be used, which is not limited herein.

Operation B2 of obtaining a corresponding second character feature vector based on the determined glyph unit weight coefficient and the corresponding glyph unit feature vector.

Specifically, based on the glyph unit weight coefficients of respective glyph units, the glyph unit feature vectors of respective glyph units are weighted and summed to obtain a second character feature vector of the character.

Taking the character "进" as an example, the weight coefficient of the glyph unit of of "辶" is multiplied by the glyph unit feature vector of "辶", and the weight coefficient of the glyph unit of "井" is multiplied by the glyph unit feature vector of "井". The two glyph unit feature vectors being multiplied by the glyph unit weight coefficients are added to obtain the second character feature vector of "进".

Operation C of obtaining a character representation vector corresponding to the at least one word based on the first character feature vector and the second character feature vector.

Specifically, the first character feature vector and the second character feature vector may be fused or combined to obtain the character representation vector of the corresponding character. The specific process of operation C of obtaining the character representation vector will be described in detail below.

In an implementation of the embodiment of the present disclosure, operation C of the obtaining the character representation vector corresponding to the at least one character based on the first character feature vector and the second character feature vector may include: operation C1 of performing linear mapping calculation on the first character feature vector to obtain the first character weight coefficient of the first character feature vector; operation C2 of obtaining a second character weight coefficient of the second character feature vector based on the first character weight coefficient; operation C3 of obtaining a character representation vector of the corresponding character based on the first character weight coefficient, the first character feature vector, the second character weight coefficient, and the second character feature vector.

Taking the character "进" as an example, the first character feature vector of "进" may be looked up, and then the second character feature vector of "进" may be obtained based on the glyph unit feature vectors of "辶" and "井". Linear mapping calculation may be performed based on the obtained first character feature vector to get the first character weight coefficient, the second character weight coefficient may be performed based on the first character weight coefficient, and finally the character representation vector of "进" may be calculated.

The specific process of linear mapping will be described in detail below.

Figure 4B:
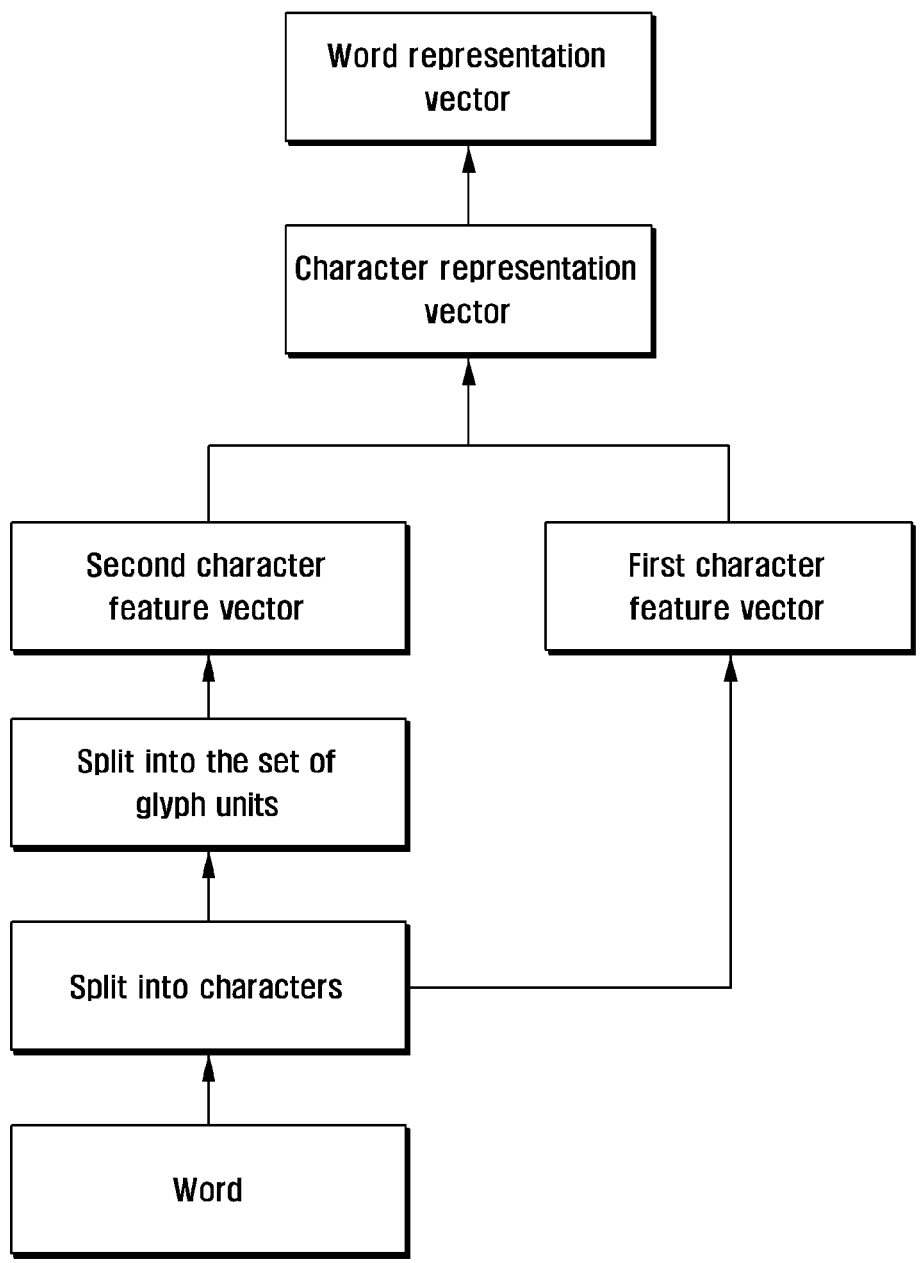
FIG. 4B illustrates a schematic flowchart of a method for determining a word representation vector according to an embodiment of the present disclosure.

As shown in FIG. 4B, taking a word including one character as an example, a set of glyph units of the character may be obtained, and a second character feature vector of the character may be obtained based on the set of glyph units. A first character feature vector of the character may be looked up, and the word representation vector of the word may be determined based on the first character feature vector and the second character feature vector, so that the word representation vector is finally determined based on the set of glyph units and the first character feature vector.

In another embodiment, the obtaining the word representation vector of the at least one word based on the character representation vector corresponding to at least one character of the at least one word may include the following steps.

Operation E of obtaining a first word feature vector of the at least one word.

Specifically, for a preset vocabulary, any word may be provided with a corresponding first word feature vector, and it may directly look up the first word feature vector respectively corresponding to at least one word.

In a specific implementing process, operation E of the obtaining a first word feature vector of the at least one word may include: operation E1 of looking up the first word feature vector corresponding to the at least one word; and operation E2 of setting a preset word feature vector as the first word feature vector when the corresponding first word feature vector is not found.

Wherein, the preset word feature vector may be a vector set for all WBVs of which the corresponding first word feature vector cannot be found, and the preset word feature vector may be a vector representing all WBVs, for example, which is represented with "unknown word feature vector", if the corresponding first word feature vector is not found, the preset word feature vector is used as the first word feature vector of the word.

Operation F of obtaining a second word feature vector of the at least one word based on the character representation vector corresponding to the at least one character.

Specifically, a character weight coefficient of at least one character that constitutes a word may be determined, and the corresponding character representation vector may be fused or combined based on the character weight coefficient to obtain a corresponding second word feature vector.

Specifically, operation F of the obtaining of a second word feature vector of the at least one word based on the character representation vector corresponding to the at least one character may include: operation F1 of determining the inner product of the character representation vector of at least one character in at least one word and the first word feature vector of the corresponding word to obtain the initial character weight of at least one character; operation F2 of obtaining a character weight coefficient of at least one character based on the initial character weight; and operation F3 of, based on the character weight coefficient of at least one character and the corresponding character representation vector, obtaining the second word feature vector of the corresponding word.

Specifically, the inner product of the character representation vector of a character and the first word feature vector of the word may be obtained. That is, the character representation vector and the first word feature vector are taken to the inner product to obtain the initial character weight of the word representation vector.

Taking "兼葭" as an example, the character representation vector of "兼" and the first word feature vector of "兼葭" are taken to the inner product to obtain the initial character weight of "兼", for example, resulting 10; the character representation vector of "葭" and the first word feature vector of "兼葭" are taken to the inner product to obtain the initial character weight of "葭", for example, resulting 30; based on a ratio of the initial character weight of "兼" and the initial character weight of "葭", it may respectively calculate the character weight coefficients of "兼" and "葭".

In the above embodiment, the initial character weight of the character is determined by calculating the inner product. In other embodiments, the initial character weight of the character may also be determined by other ways, for example, the way of the product may be used, which is not limited herein.

It can be understood that the sum of the character weight coefficients of multiple characters in a word is 1, that is, the initial character weights are normalized to obtain the character weight coefficient of "兼" of 0.25 and the character weight coefficient of "葭" of 0.75.

Operation G of obtaining the word representation vector of the at least one word based on the first word feature vector and the second word feature vector.

Specifically, the first word feature vector and the second word feature vector may be fused or combined to obtain a word representation vector of the corresponding character.

Specifically, operation G of the obtaining the word representation vector of the at least one word based on the first word feature vector and the second word feature vector may include: operation G1 of performing linear mapping calculation on the first word feature vector to obtain the first word weight coefficient of the first word feature vector; operation G2 of obtaining a second word weight coefficient of the second word feature vector based on the first word weight coefficient; and operation G3 of obtaining a word representation vector of the corresponding word based on the first word weight coefficient, the first word feature vector, the second word weight coefficient, and the second word feature vector.

Taking the word "兼葭" as an example, a first word feature vector of "兼葭" may be looked up, and then a second word feature vector of "兼葭" may be obtained based on the character feature vectors of "兼" and "葭". Linear mapping calculation may be performed based on the obtained first word feature vector to obtain the first word weight coefficient, and then the second word weight coefficient may be calculated based on the first word weight coefficient, and finally the word representation vector of "兼葭" may be calculated.

Figure 5:
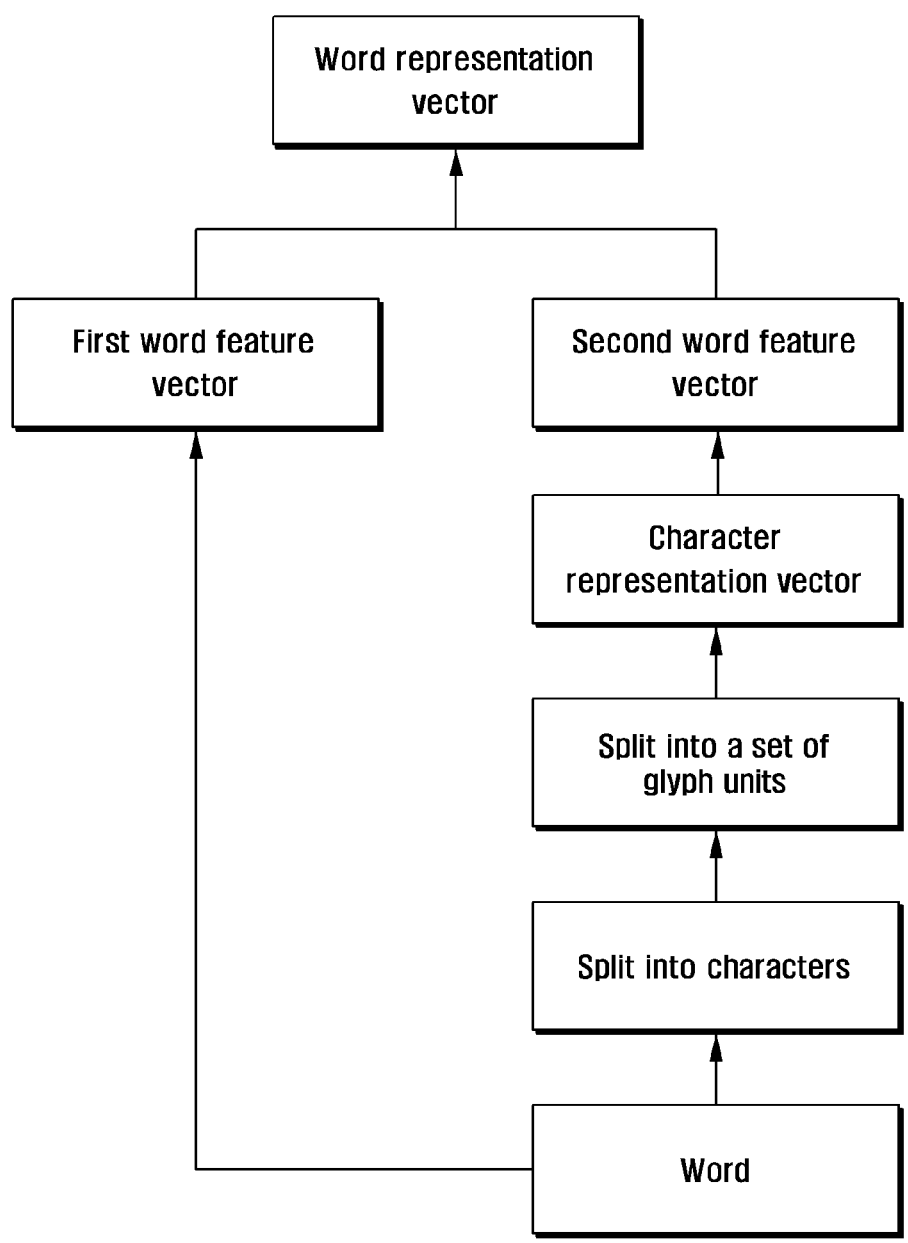
FIG. 5 illustrates a schematic flowchart of obtaining a word representation vector of a word according to an embodiment of the present disclosure.

As shown in FIG. 5, taking a word including one character as an example, it may obtain a set of glyph units of the character, obtain a character representation vector of the character based on the set of glyph units, and determine a second word feature vector of the word based on the character representation vector; it may look up a first word feature vector of the word, and determine the word representation vector of the word based on the first word feature vector and the second word feature vector, that is, the word representation vector is finally determined based on the glyph units and the first word feature vector.

Figure 6:
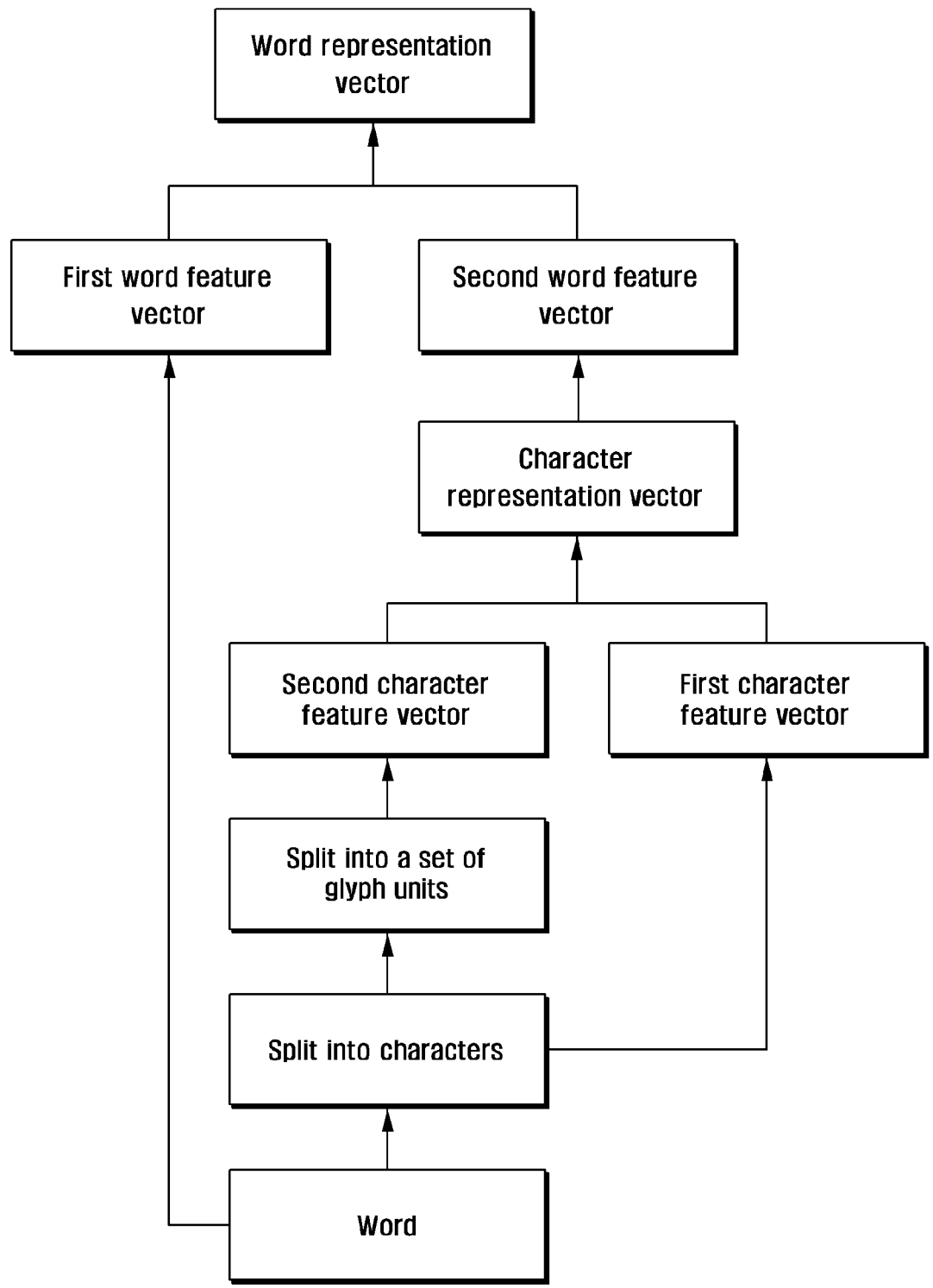
FIG. 6 illustrates a schematic flowchart of obtaining a word representation vector of a word according to an embodiment of the present disclosure.

As shown in FIG. 6, taking a word including one character as an example, a set of glyph units of the character may be obtained, and a second character feature vector of the character may be obtained based on the set of glyph units. A first character feature vector of the character may be looked up, and a second word feature vector of the word may be determined based on the first character feature vector and the second character feature vector. A first word feature vector of the word may be looked up, and the word representation vector of the word may be determined based on the first word feature vector and the second word feature vector. That is, the word representation vector is finally determined based on the glyph unit, the first character feature vector and the first word feature vector.

In the above embodiment, glyph unit information is introduced, and glyph unit-level feature, character-level feature and word-level feature are sequentially extracted and fused so that the finally resulting word representation vector includes richer semantic features, thereby improving the accuracy of the word representation vector.

The above embodiment describes the process of obtaining the second character feature vector, the character representation vector, the second word feature vector, and the word representation vector. The process of obtaining glyph unit weight coefficients or character weight coefficients through the inner product and normalization will be described below in detail in conjunction with specific embodiments and the accompanying drawings.

In an implementation of the embodiment of the present disclosure, an attention-based feature extraction (ABFE) may be used to obtain the second character feature vector of a word based on the glyph unit vector of respective glyph units, or obtain the second word feature vector of a word based on respective word feature vectors.

The ABFE calculates the weighted average sum operation of all lower level feature $l_i$ to obtain the extracted higher level feature vector h.

$$h = \sum_{i=1}^{n} w_i l_i \quad (1)$$

In the formula: $l_i$ represents the $i^{th}$ lower level feature; h represents the higher level feature; $w_i$ represents the weight coefficient of the $i^{th}$ lower level feature; i is a natural number.

It can be understood that if $l_i$ is the character representation vector corresponding to the $i^{th}$ character in a word, h represents a second word feature vector of a word, and $w_i$ represents the character weight coefficient of the $i^{th}$ character; if $l_i$ is the glyph unit feature vector corresponding to the $i^{th}$ glyph unit in a word, h represents a second character feature vector of a character, and $w_i$ represents the glyph unit weight coefficient of the $i^{th}$ glyph unit.

The weight in the weighted average sum operation of the above formula (1), that is, the weight coefficient of the glyph unit is calculated by using the following attention mechanism:

$$w_i = softmax(l_i^T h_{emb}) \quad (2)$$

In the formula, $h_{emb}$ is the higher level feature vector. If $l_i$ is the character representation vector corresponding to the $i^{th}$ character in a word, $h_{emb}$ represents the first word feature vector of a word; if $l_i$ is the glyph unit feature vector corresponding to $i^{th}$ glyph unit in a word, $h_{emb}$ represents the first character feature vector of a word.

It may calculate the inner product operation of the lower level feature $l_i$ and the higher level feature vector $h_{emb}$ to obtain an unnormalized weight, that is, an initial glyph unit weight, or an initial character weight. The weight is normalized by the Softmax operation, so that the sum of the glyph unit weight coefficients or character weight coefficients $w_i$ is 1.

In this embodiment, it may calculate the inner product operation of the lower level feature $l_i$ and the higher level feature vector $h_{emb}$ to obtain unnormalized weights. In other embodiments, the unnormalized weights may also be determined by other ways, for example, the way of product, which is not limited herein.

When the dimensions of $l_i$ and $h_{emb}$ are different, the operation process is as follows:

$$w_i = softmax(l_i^T W h_{emb}) \quad (3)$$

It may first perform linear mapping on $h_{emb}$ by using the matrix W so that its dimension is consistent with that of $l_i$, and then perform the inner product operation and Softmax operation to obtain the weight of the weighted sum operation.

Figure 7:
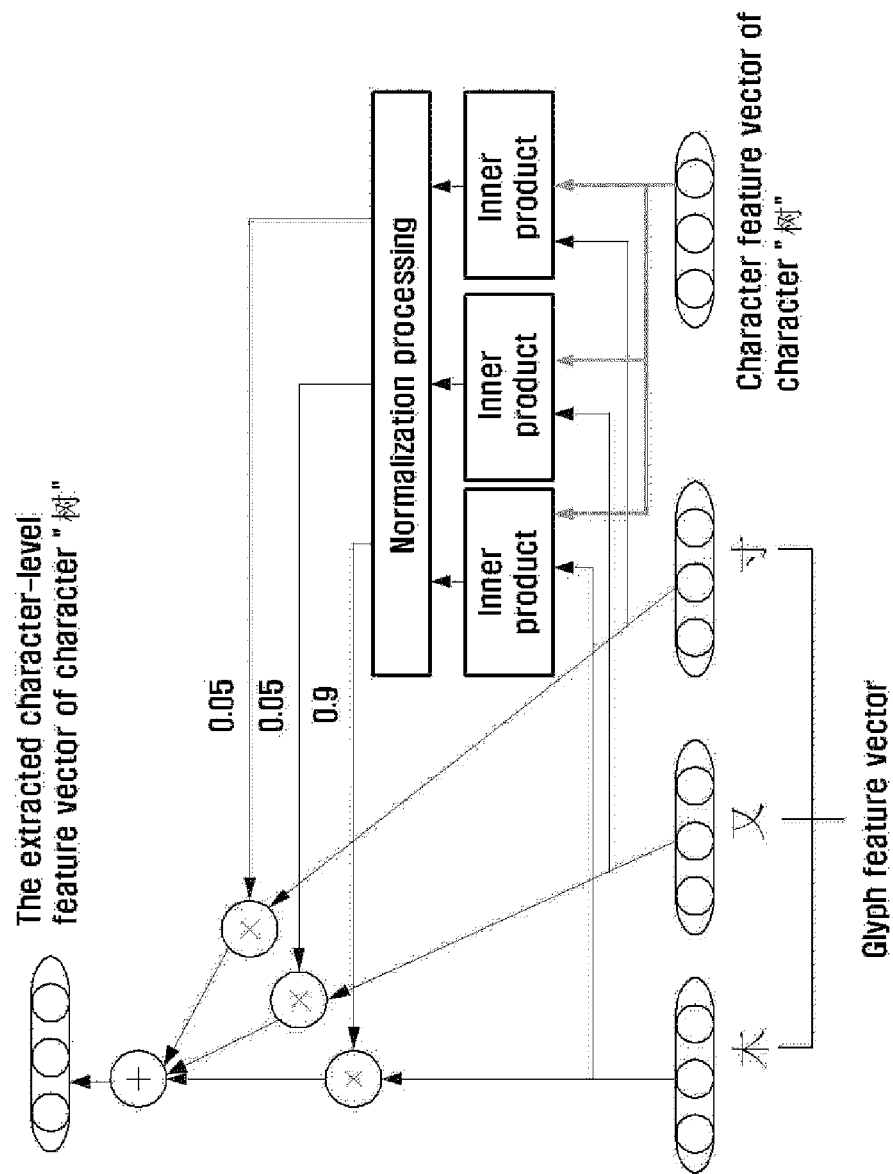
FIG. 7 illustrates a schematic flowchart of obtaining a second character feature vector of a character by using the ABFE method according to an embodiment of the present disclosure.

As shown in FIG. 7, taking the character "树" as an example, the process of obtaining the second character feature vector of "树" (that is, the character level feature vector shown in the figure) by using the ABFE is as follows: obtaining the first character feature vector of "树", that is, the "character feature vector of "树" (tree)" shown in the figure; obtaining the glyph units of "木", "又" and "寸" of "树" respectively, and then looking up the glyph unit feature vector "木", "又" and "寸", that is, the glyph unit feature vector shown in the figure, calculating the inner product of the glyph unit feature vector of "木" and the first character feature vector of "树" to obtain the initial glyph unit weight of "木"; calculating the inner product of the glyph unit feature vector of "又" and the first character feature vector of "树" to obtain the initial glyph unit weight of "又"; calculating the inner product of the glyph unit feature vector of "寸" and the first character feature vector of "树" to obtain the initial glyph unit weight of "寸"; normalizing the initial glyph unit weights of "木", "又" and "寸" to respectively obtain the weight coefficients of the glyph units of "木", "又" and "寸", which are 0.9, 0.05 and 0.05 respectively, and then based on the weight coefficients of respective glyph units, calculating the weighted sum of the glyph unit feature vectors to obtain the second character feature vector of "树", that is, the character-level feature vector of "树" shown in the figure. Wherein, the above normalization operation may be a Softmax operation.

Figure 8:
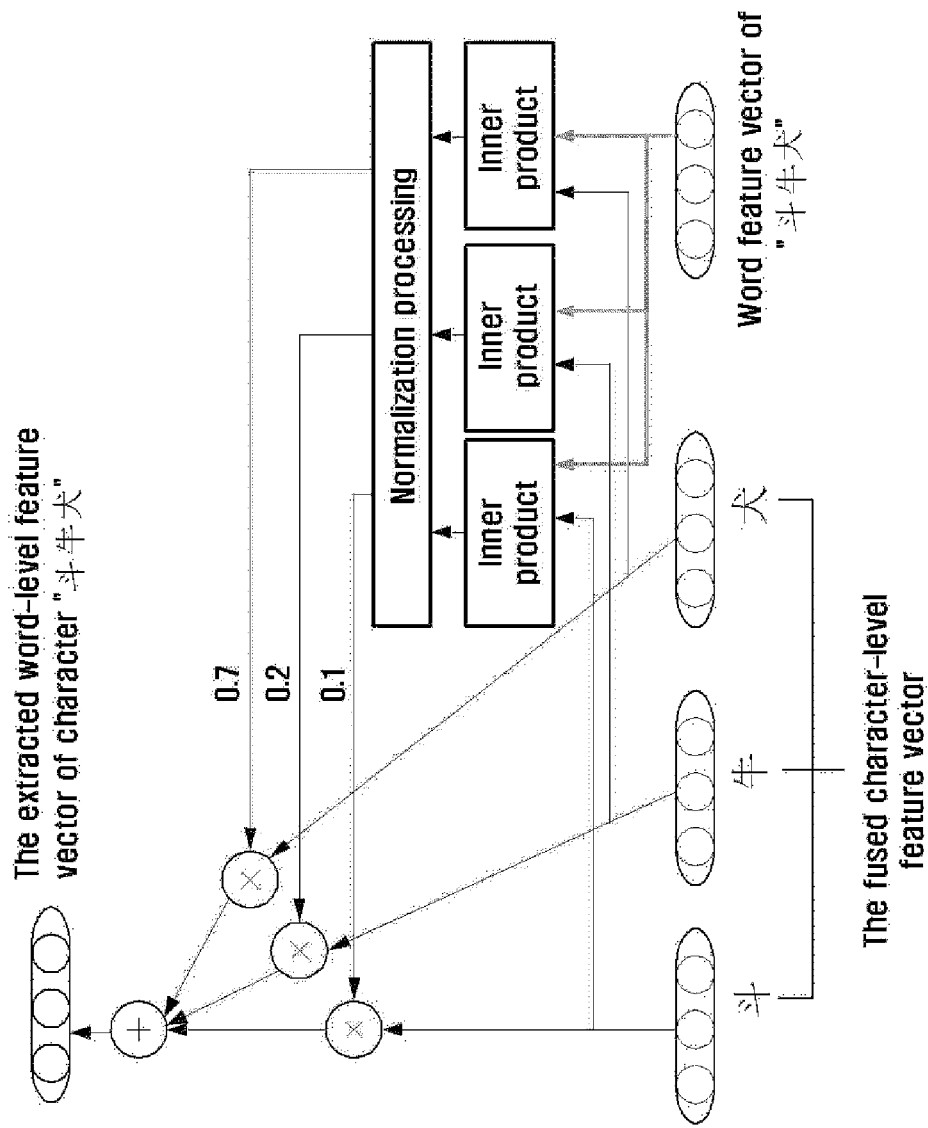
FIG. 8 illustrates a schematic flowchart of obtaining a second word feature vector of a word by using the ABFE method according to an embodiment of the present disclosure.

Similarly, as shown in FIG. 8, taking the word "斗牛犬" as an example, the process of obtaining the second word feature vector of "斗牛犬" (that is, the word-level feature vector shown in the figure) by using the ABFE is as follows: obtaining the first word feature vector of "斗牛犬", that is, the "word feature vector of "斗牛犬" (bulldog)" shown in the figure; obtaining the character representation vectors of "斗", "牛" and "犬" of "斗牛犬" respectively; calculating the inner product of the character representation vector of "斗" and the first character feature vector of "斗牛犬" to obtain the initial character weight of "斗"; calculating the inner product of the character representation vector of "牛" and the first word feature vector of "斗牛犬" to obtain the initial character weight of "牛"; calculating the inner product of the character representation vector of "犬" and the first word feature vector of "斗牛犬" to obtain the initial character weight of "犬"; normalizing the initial character weights of "斗", "牛" and "犬" to respectively obtain the character weight coefficients of "斗", "牛" and "犬", which are 0.1, 0.2 and 0.7 respectively, and then based on the character weight coefficients, calculating the weighted sum of the character feature vectors to obtain the second word feature vector of "斗牛犬", that is, the word-level feature vector of "斗牛犬" shown in the figure.

The higher the semantic contribution of a character or a glyph unit, the greater the corresponding weight. In this case, the "犬" has the largest weight. It can ensure that the sum of weights is 1 by using the Softmax operation, and the character or the glyph unit with more semantic contribution is provided with a larger weight, and it may extract more information related to the semantics of the word.

The above embodiment describes the process of calculating and normalizing the inner product to obtain the glyph unit weight coefficient or character weight coefficient, that is, the process of using ABFE.

In an implementation of the embodiments of the present disclosure, a cosine-based feature extractor (CosFE) may be used to obtain the second character feature vector of a character based on the glyph unit vectors of glyph units, or obtain the second word feature vector of a word based on character feature vectors.

The process of obtaining the second character feature vector of a character based on the glyph unit vector of the glyph units by using the CosFE is as follows:

obtaining the cosine similarity between the glyph unit feature vector of the glyph unit and the first character feature vector of a character; and using the obtained cosine similarity value as the corresponding glyph unit weight coefficient, it should be noted that the glyph unit weight coefficients herein do not need to be normalized, and the sum of the weight coefficients of the glyph units may not be 1; and obtaining the second character feature vector by calculating the weighted sum of the glyph unit weight coefficients and the corresponding glyph unit feature vectors.

Figure 9:
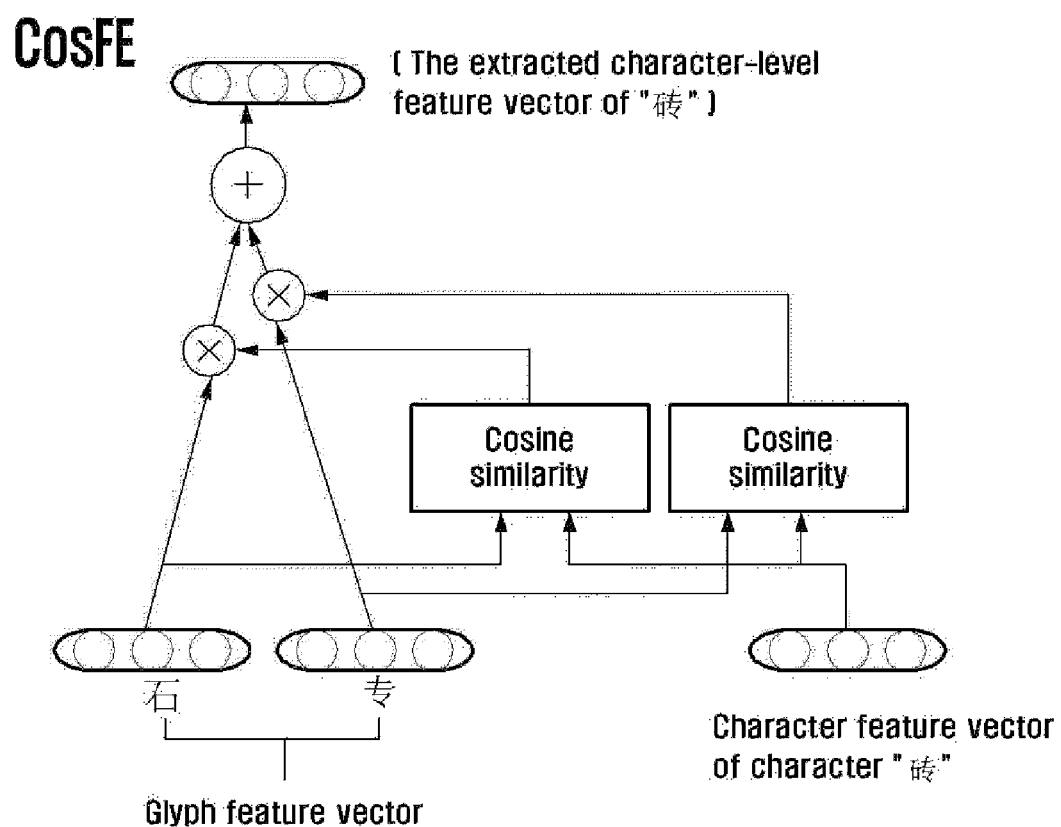
FIG. 9 illustrates a schematic flowchart of obtaining a second character feature vector of a character by using the CosFE method according to an embodiment of the present disclosure.

As shown in FIG. 9, for example, obtaining the second character feature vector of "砖", that is, the "character-level feature vector of "砖" (brick)" shown in the figure, it may respectively obtain the glyph unit feature vectors of "石" and "专", that is, the glyph unit feature vector shown in the figure, obtain the cosine similarity between the glyph unit feature vector of "石" and the first character feature vector of "砖"; obtain the cosine similarity between the glyph unit feature vector of "专" and the first character feature vector of "砖", use the obtained similarity as the corresponding glyph unit weight coefficient; and obtain the second character feature vector of "砖" by calculating the weighted sum of the glyph unit feature vectors, that is, "character-level feature vector of "砖" (brick)" shown in the figure.

It can be understood that, in other embodiments, it may also obtain the second character feature vector of a word based on the glyph unit vector of the glyph unit in other ways, or obtain the second word feature vector of a word based on the character feature vectors.

The following will further describe the linear mapping and the fusion of the first character feature vector and the second character feature vector, or the fusion of the first word feature vector and the second word feature vector based on results of the linear mapping in conjunction with specific embodiments and the accompanying drawings.

In an implementation of the embodiment of the present disclosure, a method of fusing the first character feature vector and the second character feature vector, and a method of fusing the first word feature vector and the second word feature vector are described as a Gated Feature Fusion (GFF) method.

The GFF is used to fuse or combine the extracted feature vector $f_{ex}$ (i.e., the second character feature vector or the second word feature vector) and the feature vector $f_{emb}$ (i.e., the first character feature vector or the first word feature vector) obtained through the table lookup. The ratio of the extracted feature vector $f_{ex}$ and the feature vector $f_{emb}$ obtained through the table lookup in the fusion process is controlled by the gating value $w_g$.

$$f_{rep} = (1 - w_g)f_{emb} + w_g f_{ex} \quad (4)$$

In the formula: $f_{ex}$ is the extracted lower level feature vector; $f_{emb}$ is the lower level feature vector obtained through the table lookup; $f_{rep}$ is the higher level feature vector obtained through fusion; $w_g$ is the gating value.

That is, in the process of obtaining the character representation vector, $f_{ex}$ is the second character feature vector, $f_{emb}$ is the first character feature vector, and $f_{rep}$ is the character representation vector; in the process of obtaining the word representation vector, $f_{ex}$ is the second word feature vector, $f_{emb}$ is the first word feature vector, and $f_{rep}$ is the word representation vector.

The gating value $w_g$ is calculated by the GFF based on the feature vector $f_{emb}$ obtained through the table lookup. The gating value is a value between 0-1. The calculation process of the gate value is as follows:

$$w_g = \sigma(\omega^T f_{emb}) \quad (5)$$

$\omega$ is a trainable weight vector, $\sigma(\bullet)$ is a sigmoid function, which makes the output $w_g$ be a value between 0-1.

Figure 10:
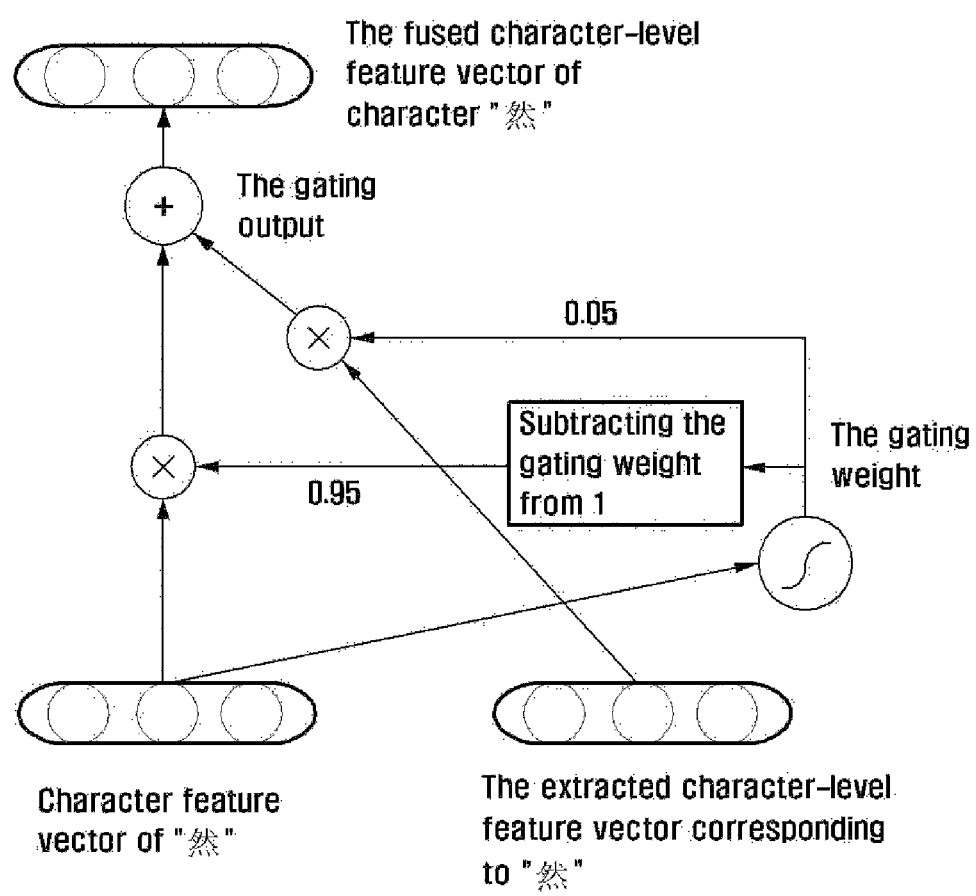
FIG. 10 illustrates a schematic flowchart of obtaining a character representation vector of a character using the GFF method according to an embodiment of the present disclosure.

As shown in FIG. 10, for example, obtaining the character representation vector of the word "燃", it may obtain the first character feature vector of "燃", that is, the character feature vector of "燃" shown in the figure; obtain the second character feature vector of "燃", that is, the extracted character-level feature vector corresponding to the "燃" shown in the figure; obtain the gating weight of 0.05 based on the first character feature vector of the character "燃", and get the first character weight coefficient 0.95 corresponding to the first character feature vector by subtracting the gating weight from 1; multiply the first character feature vector by the first character weight coefficient of 0.95, multiply the second character feature vector by the gating weight of 0.05, and finally get the character representation vector by adding the above two, which is the "fused character-level feature vector" shown in the figure.

Figure 11:
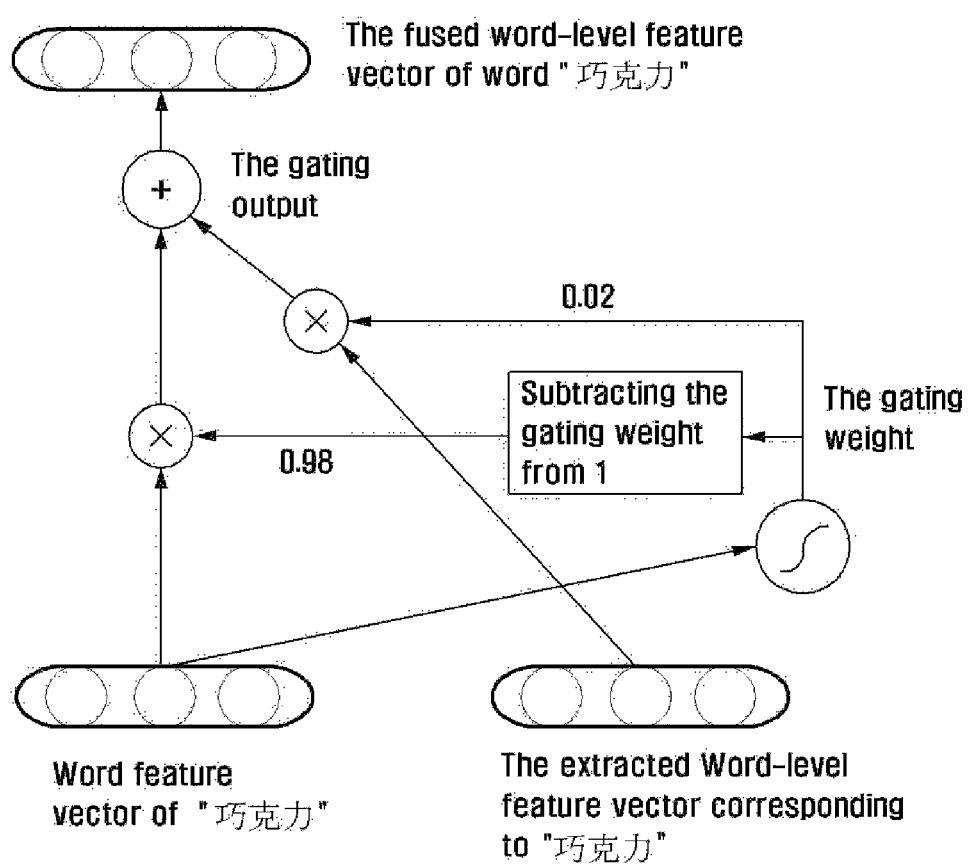
FIG. 11 illustrates a schematic flowchart of obtaining a word representation vector of a word using the GFF method according to an embodiment of the present disclosure.

Similarly, as shown in FIG. 11, for example, obtaining the word representation vector of a word "巧克力", it may obtain the first word feature vector of "巧克力", that is, the word feature vector of "巧克力" shown in the figure; obtain the second word feature vector of "巧克力", that is, the extracted word-level feature vector corresponding to "巧克力" shown in the figure; obtain the gating weight of 0.02 based on the first word feature vector of the word "巧克力", and compute the first word weight coefficient 0.98 corresponding to the first word feature vector by subtracting the gating weight from 1; multiply the first word feature vector by the first word weight coefficient of 0.98; multiply the second word feature vector by the gating weight of 0.02, and finally compute the "fused word-level feature vector" shown in the figure by adding the above two.

By using the gating weight, GFF may adjust the ratio of the first word feature vector and the second word feature vector. For example, the characters "巧", "克" and "力" do not contain any semantic meaning related to the word "巧克力". Therefore, the first word feature vector extracted from these characters is useless for the word representation of "巧克力", of which the proportion is very small, as shown in the left figure, it is 0.05, and the proportion of word embedding is large, and it is 0.95, so the proportion making low semantic contribution will be small, and the proportion making high semantic contribution will be large, so that it can better retain valid semantic features.

In other embodiments, the GFF method can also be replaced with the add operation, that is, the first word feature vector and the second word feature vector are directly added and fused.

In the above embodiment, when the first character feature vector and the second character feature vector are fused or combined, or the first word feature vector and the second word feature vector are fused or combined, it may first obtain the gating weights through the linear mapping, and then calculate the weighted sum of the first character feature vector and the second character feature vector, or the weighted sum of the first word feature vector and the second word feature vector according to the gating weights, thus it can effectively obtain the semantic information most relevant to the character meaning or word meaning, thereby further improving the accuracy of determining the word vector.

The above method of determining a word representation vector obtains the word representation vector through the set of glyph units in the text, even for hieroglyphics in which hyperbolic characters are prone to appear or languages evolved from the hieroglyphics, it still can effectively obtain a corresponding set of glyph units, thereby improving an accuracy of determining the word representation vector.

Furthermore, the set of glyph units is introduced to sequentially extract and fuse three or more levels of features, such as glyph units, characters and words, so that the finally resulted word representation vector contains richer semantic features and improves the accuracy of the word representation vector.

Furthermore, for characters beyond the vocabulary (CBV) or words beyond the vocabulary (WBV) that are difficult to look up, they may be split into glyph units, and the resulted glyph units can still include valid semantic information, thereby further improving the accuracy of determining the word representation vector.

Furthermore, when fusing the first character feature vector and the second character feature vector, or fusing the first word feature vector and the second word feature vector, it may first obtain the gating weights through linear mapping, or obtain character feature weights by using cosine similarity, and then obtain the weighted sum of the first character feature vector and the second character feature vector or the weighted sum of the first word feature vector and the second word feature vector based on the gating weights or the character feature weights, which can effectively obtain the semantic information that is most relevant to the meaning of the character or the meaning of the word, thereby further improving the accuracy of determining the word representation vector.

In order to better understand the above method of determining a word representation vector, the following describes an example of determining the word representation vector of the present disclosure in detail.

Figure 12:
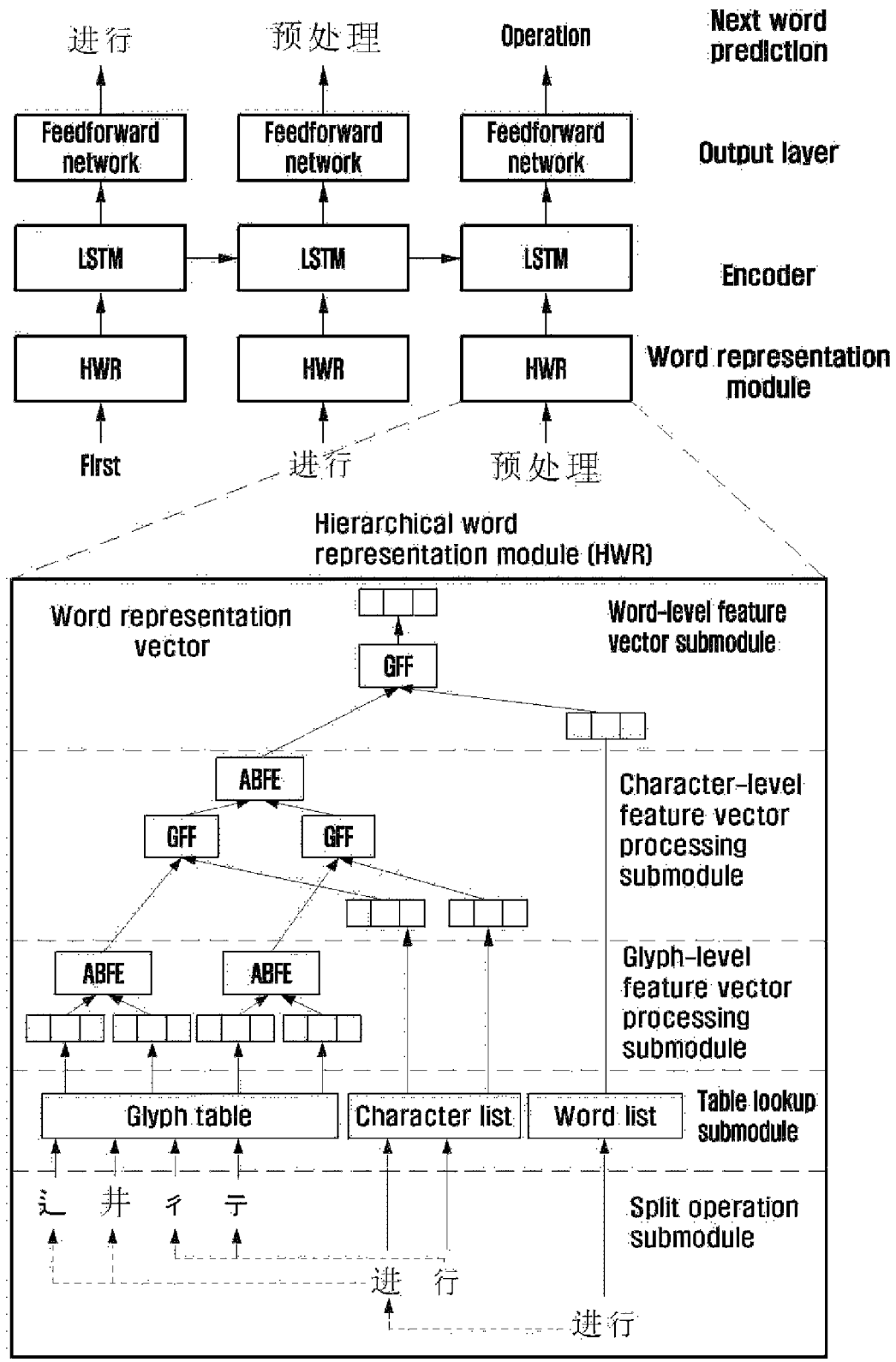
FIG. 12 illustrates a schematic flowchart of a method for determining a word representation vector according to an embodiment of the present disclosure.

In an example, as shown in FIG. 12, the method for determining a word representation vector provided by this disclosure can be applied to the device shown in FIG. 12. The device may be composed of three major parts, which are a hierarchical word representation (HWR) module, an encoder and an output layer.

1. The first part is our latest proposed hierarchical word representation (HWR) module, which consists of five sub-modules, which are:

(1) split operation submodule: when a word in a pictograph language is input to the word representation module, the split operation submodule in the module first splits the input word into characters, and then splits the resulting character into individual glyphs (i.e., glyph units) that constitute the character according to the character split table;

(2) table lookup submodule: this submodule obtains the word feature vector corresponding to the currently input word (i.e., the first word feature vector) by looking up the prestored word list, character list and glyph table (i.e., glyph unit table, referring to a schematic diagram shown in FIG. 3), and the feature vectors corresponding to characters and glyph units split by the split operation submodule in (1) (i.e., the first character feature vector and the glyph unit feature vector);

(3) glyph-level feature processing submodule (or referred to as glyph-level feature vector processing submodule): first, the attention-based feature extraction method (the above "ABFE" module) is used to generate a fixed length feature vector from the glyph feature vectors (that is, the glyph unit feature vectors) of the glyphs split in (1) (the specific operation process will be described in detail in the next paragraph). This feature vector is called "extracted character-level feature vector". The extracted character-level feature vector contains the information most relevant to the word meaning, that is, the above second character feature vector. The extracted character-level feature vectors corresponding to respective words will be input to the next submodule.

The process of generating the extracted character-level feature vectors is shown in FIG. 7. The attention-based feature extraction method is used to obtain the extracted character-level feature vector by calculating the weighted sum of glyph feature vectors of all glyphs that constitute a single character. The weights used in the weighted sum may be obtained by calculating the inner product of the glyph feature vector (i.e., the glyph unit feature vector) and the character feature vector (the first character feature vector) from the table lookup operation in (2). The weights calculated by the inner product will be normalized to ensure that the sum of weights is 1.

(4) character-level feature processing submodule (or referred to as character-level feature vector processing submodule): this part firstly fuses the character feature vector from the table lookup operation and the extracted character-level feature vector (the second character feature vector) from (3) by using a gated feature fusion method (the above "GFF" method) (the specific operation process will be described in detail in the next paragraph), to obtain a new character-level feature vector (the character representation vector), the feature vector is called "fused character-level feature vector". Then, it may again use the attention-based feature extraction method to extract a fixed length feature vector from the fused character-level feature vectors corresponding to the split characters (the specific operation process will be described in detail in the next paragraph), the feature vector is called "extracted word-level feature vector", and the extracted word-level feature vector contains the semantic information most relevant to the meaning of the word, that is, the above word representation vector. The vector is then input to the next submodule.

The process of generating the fused character-level feature vector is shown in FIG. 10. The gated feature fusion method controls the proportion of the extracted character-level feature vector and the character feature vector in the fusion process through weights ("gated weights" shown in the figure). The weight is a value between 0 and 1, which is calculated by the linear mapping from the character feature vectors. The proportion of the extracted character-level feature vector in the fusion is the weight, and the proportion of the character feature vector in the fusion is a value calculated by subtracting the weight from 1. If the character feature vector from the table lookup operation is valid (that is, the character is not a CBV, of which the corresponding character feature vector can be found in the character list), then the character feature vector will occupy a large proportion in the fusion process, accordingly, the proportion of the extracted character-level feature vector (the second character feature vector) will be relatively small; if the character feature vector (the first character feature vector) from the table lookup operation is invalid (that is, the character is a CBV, of which the corresponding character feature vector cannot be found in the character list), then the extracted character-level feature vector (the second character feature vector) will occupy a large proportion in the fusion process, accordingly, the proportion of the character feature vector (the first character feature vector) will be relatively small.

The process of generating the extracted word-level feature vectors is shown in FIG. 8. The attention-based feature extraction method is used to obtain the extracted word-level feature vector (the second word feature vector) by calculating the weighted sum of the fused character-level feature vectors corresponding to all characters that constitute a word. The weights used in the weighted sum may be obtained by calculating the inner product of the fused character-level feature vector (i.e., the character representation vector) and the word feature vector (the first word feature vector) from the table lookup operation. The weights calculated by the inner product will be normalized to ensure that the sum of weights is 1.

(5) word-level feature processing submodule (or referred to as word-level feature vector submodule or word-level feature vector processing submodule): this submodule fuses the word feature vector from the table lookup operation and the extracted word-level feature vector (the second word feature vector) from (4) by using a gated feature fusion method (the specific operation process will be described in detail in the next paragraph), to obtain a fused word-level feature vector (the word representation vector). The fused word-level feature vector (the word representation vector), as the word representation vector finally generated by the word representation module, is output to the next part—the encoder.

The process of generating the fused word-level feature vector (the word representation vector) is shown in FIG. 11. The gated feature fusion method controls the proportion of the extracted word-level feature vector and the word feature vector in the fusion process through weights ("gated weights" shown in the figure). The weight is a value between 0 and 1, which is calculated by the linear mapping from the word feature vectors. The proportion of the extracted word-level feature vector (the second word feature vector) in the fusion is the weight, and the proportion of the word feature vector in the fusion is a value calculated by subtracting the weight from 1. If the word feature vector from the table lookup operation is valid (that is, the word is not a WBV, of which the corresponding word feature vector can be found in the word list), then the word feature vector (the first word feature vector) will occupy a large proportion in the fusion process, accordingly, the proportion of the extracted word-level feature vector (the second word feature vector) will be relatively small; if the word feature vector (the first word feature vector) from the table lookup operation is invalid (that is, the word is a WBV, of which the corresponding word feature vector cannot be found in the word list), then the extracted word-level feature vector (the second word feature vector) will occupy a large proportion in the fusion process, accordingly, the proportion of the word feature vector (the first word feature vector) will be relatively small.

2. The second part is an encoder, which may be any kind of encoder based on a neural network, such as a feedforward neural network encoder, long and short-term memory network (LSTM) encoder, Transformer-XL encoder, etc. The encoder may encode the word representation vector from the hierarchical word representation module to obtain the current context vector and output it to the output layer. (Note: the following embodiments and "the structural diagram of FIG. 12 according to the present disclosure" are described through taking the LSTM encoder as an example.)

3. The last part is the output layer, which is a single layer of the feedforward neural network. According to the context vector obtained by the encoder, the output layer may calculate the probability of the character in the word list appearing in the next position through linear calculation and normalization processing, and then predict the word at the next position.

In the above example, a hierarchical word representation (HWR) module is provided, which creates a hieroglyphic representation by setting the glyph unit, and designs ABFE and GFF to obtain the character representation vector and the word representation vector. The GFF may adjust the ratio of the first character feature vector and the second character feature vector and adjust the ratio of the first word feature vector and the second word feature vector based on whether the word or character itself has valid semantic information, so that the resulting word representation vector has more rich semantic information.

In order to better understand the above method of determining a word representation vector, the following will describe an example of determining the word representation vector according to the present disclosure in detail.

In this example, the HWR is replaced with a simplified HWR. The simplified HWR only uses glyph units to generate the final word representation vector. The simplified HWR may not perform as well as the original HWR, but it has a faster operating speed and a smaller size.

The simplified HWR only retains the component information of the input word, and directly creates the final word representation (i.e., the word representation vector), which may include:

Split operation: in which the input character or word is split into multiple components, that is, multiple glyph units.

Lookup table: in which the glyph unit feature vectors are assigned to respective split glyph units by a look up table.

Glyph unit level: ABFE extracts a character-level feature vector from the glyph unit feature vectors.

Character level: ABFE extracts a word-level feature vector from these character-level feature vectors.

Word level: the word-level feature vector extracted from the character-level feature vectors is the final word representation vector.

Figure 13:
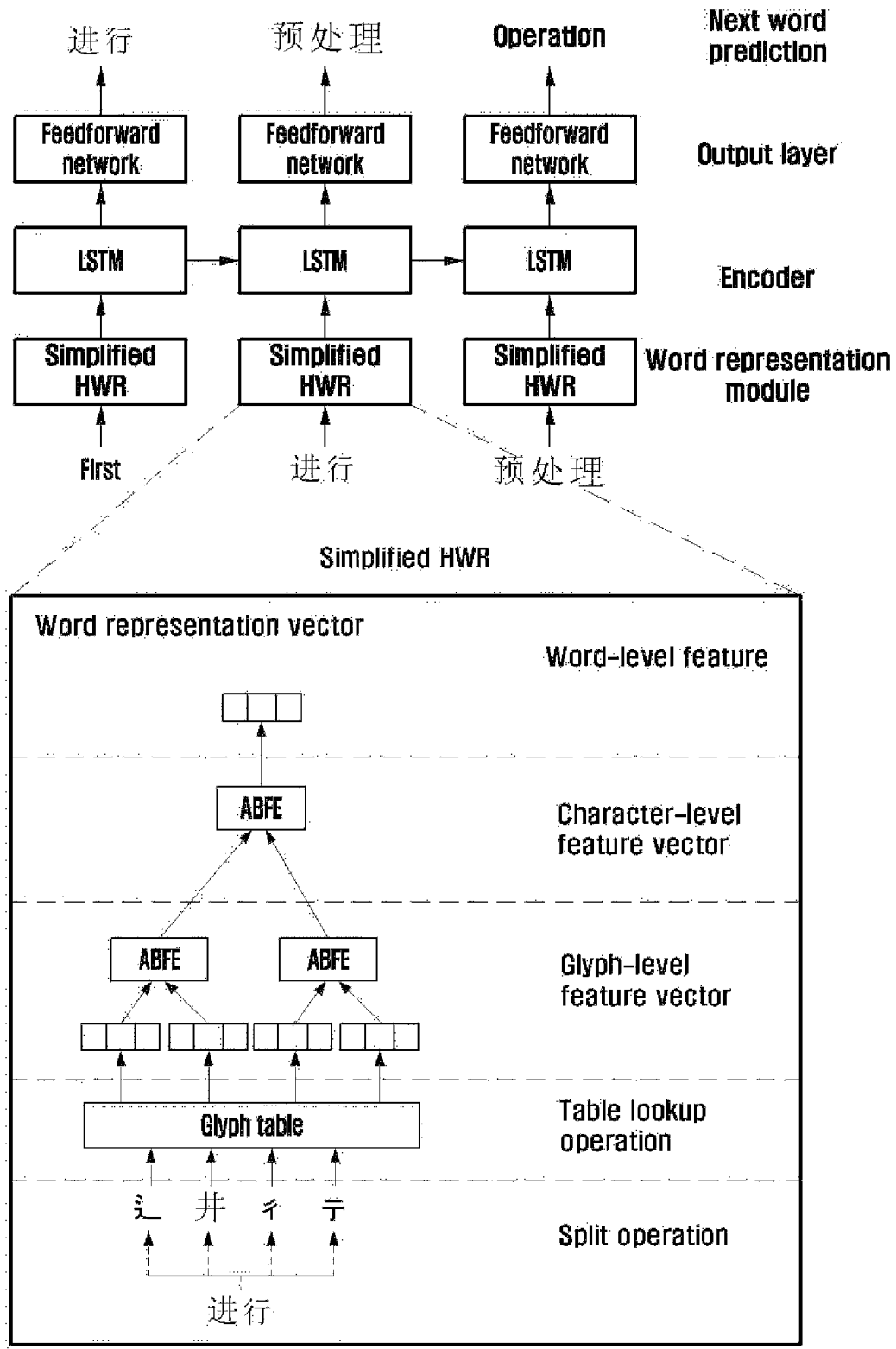
FIG. 13 illustrates a schematic flowchart of a method for determining a word representation vector according to an embodiment of the present disclosure.

In an example, as shown in FIG. 13, the current word of the sentence input into the neural network language model is " 进行 ".

1) The input word " 进行 " is split into " 进 " and " 行 ", and the characters " 进 " and " 行 " are respectively split to a set of glyph units;

2) A lookup table operation is performed in the glyph table (that is, the glyph unit table) to look up the glyph unit feature vector corresponding to the glyph unit in the set of glyph units. Take the " 辶 " and " 井 " of the character " 进 " as an examples, it may look up the glyph unit feature vector of "辶" and the glyph unit feature vector of "井";

3) The ABFE is used to obtain the weight coefficients of the glyph units of "辶" and "井"; the second character vector of "进" is obtained based on the weight coefficient of the glyph unit of "辶" and the feature vector of the glyph unit of "辶", the weight coefficient of the glyph unit of "井" and the feature vector of the glyph unit of "井". It should be noted that there is no need to obtain the first character feature vector of "进", but directly use the second character vector of "进" as the character representation vector.

4) The same ABFE is used to obtain the second character feature vector of the character "行" and the second character feature vector of the character "行" is used as the character representation vector of the character "行";

5) The ABFE is used to obtain the character weight coefficients of "进" and "行", and the second word feature vector of "进行" is obtained based on the character weight coefficient of "进" and the character representation vector of "进", the character weight coefficient of "行" and the character representation vector of "行";

6) The second word feature vector of "进行" is used as the word representation vector of "进行";

7) The word representation vector of "进行" is input into the long and short-term memory (LSTM) network for encoding to generate a context vector;

8) The output layer uses the feedforward neural network to calculate the probability of the word in the word list appearing in the next position based on the context vector and then predict the word at the next position.

In the above example, it may not obtain the first character feature vector, and directly use the second character feature vector as the character representation vector; and may not obtain the first word feature vector, and the second word feature vector as the word representation vector. For characters or words that have few or no semantic features, the resulting word representation vector can not only retain valid semantic features, but also reduce the amount of calculation and improve prediction efficiency.

In order to better understand the above method of determining a word representation vector, the following describes an example of the determination word representation vector of the present disclosure in detail.

Figure 14:
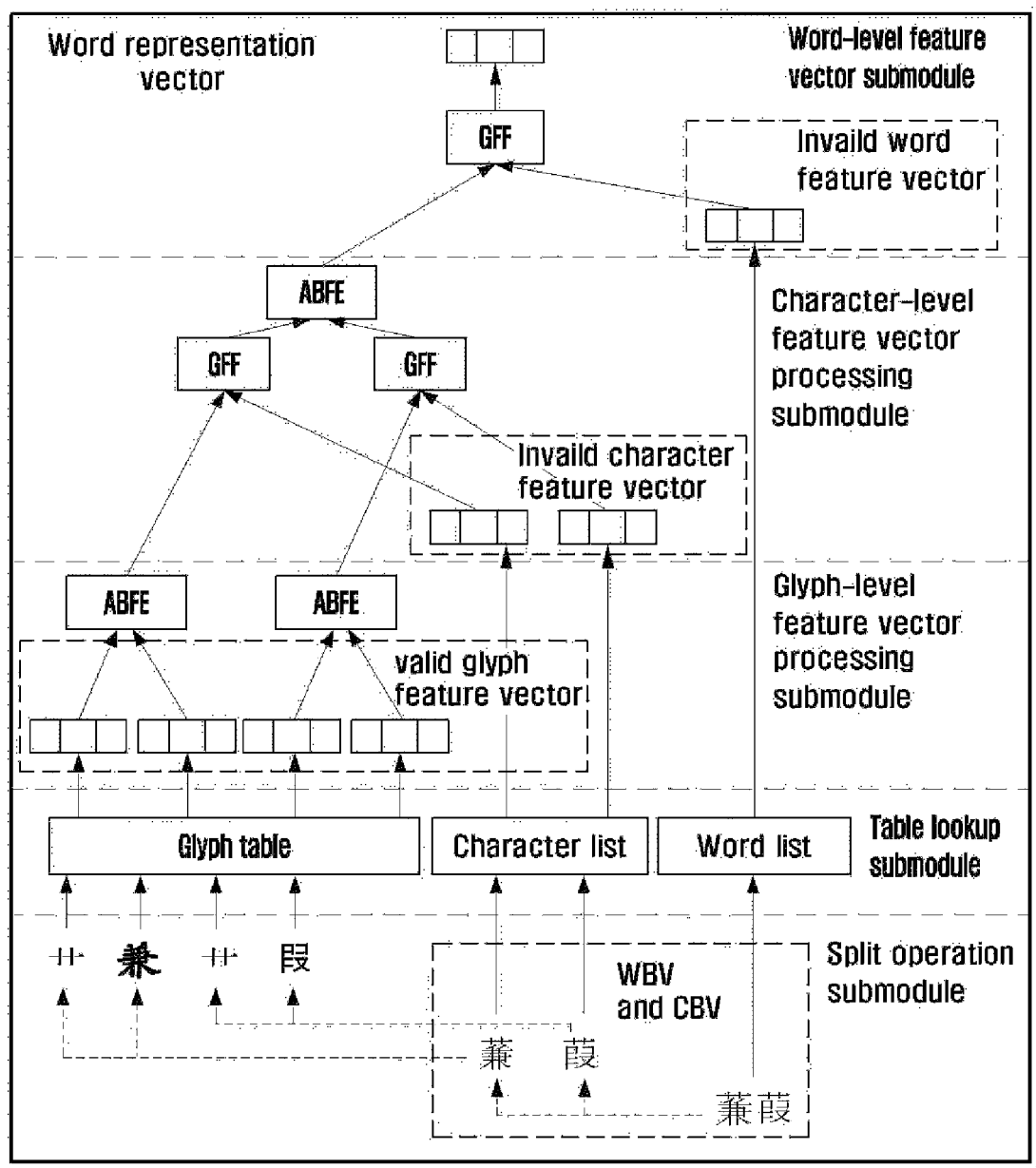
FIG. 14 illustrates a schematic flowchart of processing text according to an embodiment of the present disclosure.

In one example, as shown in FIG. 14, the current word of the sentence input to the neural network language model is "蒹葭".

1. First, the word is input to the hierarchical word representation module, which passes through the following submodules in turn (the specific execution process is shown in FIG. 14):

(1) split operation submodule: first, "蒹葭" is split into two characters "蒹" and "葭". According to the character split table, the single character "蒹" is split into two glyph units of "艹" and "兼". Similarly, according to the character split table, "葭" is split into two glyph units of "艹" and "叚".

(2) table lookup submodule: since "蒹葭" is a WBV, the table lookup operation cannot find the corresponding word feature vector. The characters "蒹" and "葭" that constitute the word "蒹葭" are also CBVs, and the corresponding character feature vectors cannot be found by the table lookup operation. Therefore, the feature vectors of words and characters output by the table lookup operation are invalid. However, the glyph unit of the character can be found in the glyph unit table (i.e., glyph table), and the glyph unit "艹" contains valid semantic information—it indicates that the word describes an herbaceous plant. Therefore, the table lookup submodule can output effective glyph unit feature vectors (that is, the effective glyph feature vectors shown in the figure), and these feature vectors contain information related to word meanings.

(3) glyph-level feature processing submodule (also referred to as glyph-level feature vector processing submodule): the attention-based feature extraction method (the above "ABFE" module) is used to respectively generate the extracted character-level feature vectors corresponding to these two characters from the glyph units that constitute "蒹" and "葭". Since "艹" is more related to the meaning of words, "艹" has the largest weight in weighted summation. Therefore, the extracted word-level feature vectors mainly contain information related to the glyph unit "艹".

(4) character-level feature processing submodule (or referred to as character-level feature vector processing submodule): since "蒹" and "葭" are CBVs, the character feature vectors obtained by the table lookup operation are invalid. Therefore, the gated feature fusion method (the "GFF" module in FIG. 14) may adjust the weights and increase the proportion of the extracted character-level feature vectors in the fusion, and the proportion of the character feature vectors will decrease accordingly, which causes that the fused character-level feature vector mainly contains information of the extracted character-level feature vector. In this case, the fused character-level feature vector mainly contains information related to the glyph unit "艹". Subsequently, the gated feature fusion method (the "GFF" module in FIG. 14) may generate the extracted word-level feature vectors corresponding to "蒹葭" from the fused character-level feature vectors corresponding to the characters "蒹" and "葭", since both the two characters are related to the meaning of "蒹葭", the weights of the two characters will be relatively close (the sum of weights is 1). In this case, the extracted word-level feature vectors mainly contain information related to the glyph unit "艹".

(5) word-level feature processing submodule (or referred to as word-level feature vector submodule or word-level feature vector processing submodule): since "蒹葭" is a WBV, its word feature vector obtain by the table lookup operation is invalid. Therefore, the gated feature fusion method (the "GFF" module in FIG. 14) may adjust the weights and increase the proportion of the extracted word-level feature vectors in the fusion, and the proportion of the word feature vectors will decrease accordingly, which causes that the fused word-level feature vector mainly contains information of the extracted word-level feature vector. In this case, the fused word-level feature vector (that is, the word representation vector finally output by the hierarchical word representation module) will mainly contain information related to the glyph unit "艹". The following encoder can still obtain valid semantic information from the word representation vector—that is, the word describes an herbaceous plant.

2. Next, the word representation vector generated by the hierarchical word representation module is input to the long and short-term memory (LSTM) network for encoding to generate the context vector.

3. Based on the context vector, the output layer uses a feedforward neural network to calculate the probability that a word in the vocabulary appears in the next position, and then predict the word at the next position.

In the above example, if the word itself or the character itself does not include semantic information or contains less valid semantic information, when the weighted sum of the first character feature vector and the second character feature vector, or the weighted sum of the first word feature vector and the second word feature vector is obtained, it may reduce the weight of the first character feature vector obtained by the table lookup operation, or reduce the weight of the first word feature vector obtained by the table lookup operation, so that the resulting word representation vector contains more semantic information obtained based on glyph units, so as to obtain more valid semantic information, and further improve the accuracy of determining the word representation vector.

In order to better understand the above method of determining a word representation vector, the following describes an example of the determination word representation vector of the present disclosure in detail.

Figure 15:
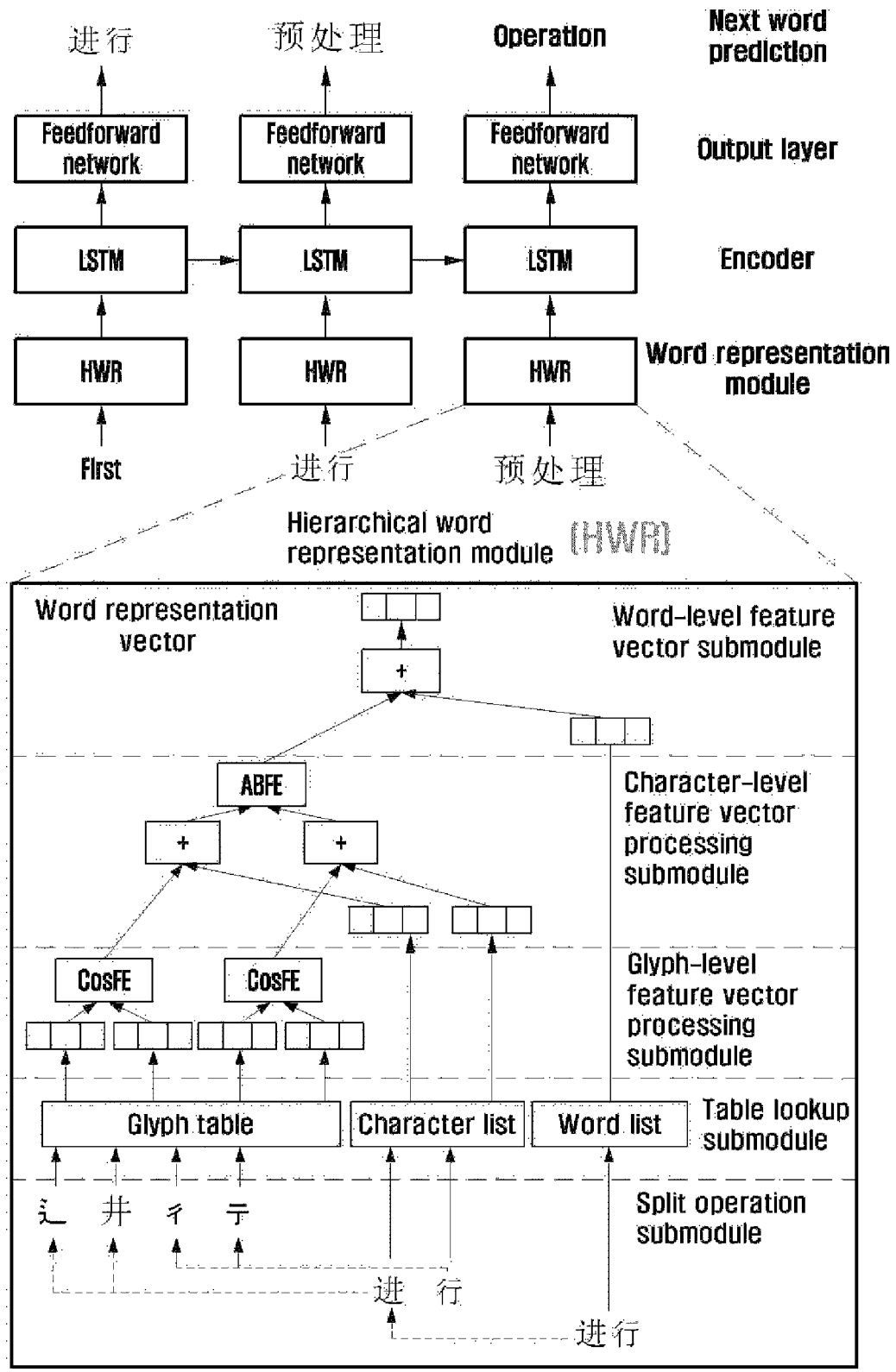
FIG. 15 illustrates a schematic flowchart of a method for determining a word representation vector according to an embodiment of the present disclosure.

In an example, as shown in FIG. 15, taking the processing of "进行" as an example, the method for determining a word representation vector provided by this disclosure may include the following steps.

1) The word "进行" is split into "进" and "行", and the characters "进" and "行" are respectively split to a set of glyph units;

2) A lookup table operation is performed in the glyph table (that is, the glyph unit table) to look up the glyph unit feature vector corresponding to the glyph unit in the set of glyph units. Take the "辶" and "井" of the character "进" as an examples, it may look up the glyph unit feature vector of "辶" and the glyph unit feature vector of "井";

3) A table lookup operation is performed in the character list to look up the first character feature vector corresponding to "进", and it may calculate the cosine similarity between the glyph unit feature vector of "辶" and the first character feature vector corresponding to "进"; and calculate the cosine similarity between the glyph unit feature vector of "井" and the first character feature vector corresponding to "进";

4) The obtained cosine similarity is used as the weight coefficients of the glyph units of "辶" and "井", respectively; and the second character vector of "进" is obtained based on the weight coefficient of the glyph unit of "辶" and the feature vector of the glyph unit of "辶", the weight coefficient of the glyph unit of "井" and the feature vector of the glyph unit of "井";

5) The same CosFE method is used to obtain the second character feature vector of the character "行";

6) It may look up the first character feature vector of "进", and add the first character feature vector and the second character feature vector of "进" to get the character representation vector of "进"; similarly, it may look up the first character feature vector of "行", and add the first character feature vector and the second character feature vector of "行" to get the character representation vector of "行";

7) A table lookup operation is performed in the word list to look up the first word feature vector of "进行"; calculate the cosine similarity between the character representation vector of "进" and the first word feature vector of "进行"; calculate the cosine similarity between the character representation vector of "行" and the first word feature vector of "进行";

8) The obtained cosine similarity is used as the character weight coefficients of "进" and "行" respectively; and the second word vector of feature vector of "进行" is obtained based on the character weight coefficient of "进" and the character representation vector of "进", the character weight coefficient of "行" and the character representation vector of "行";

9) The first word feature vector and the second word feature vector of "进行" are added to get the word representation vector of "进行";

10) The word representation vector of "进行" is input into the long and short-term memory (LSTM) network for encoding to generate a context vector;

11) The output layer uses the feedforward neural network to calculate the probability of the word in the word list appearing in the next position based on the context vector and then predict the word at the next position.

Figure 16:
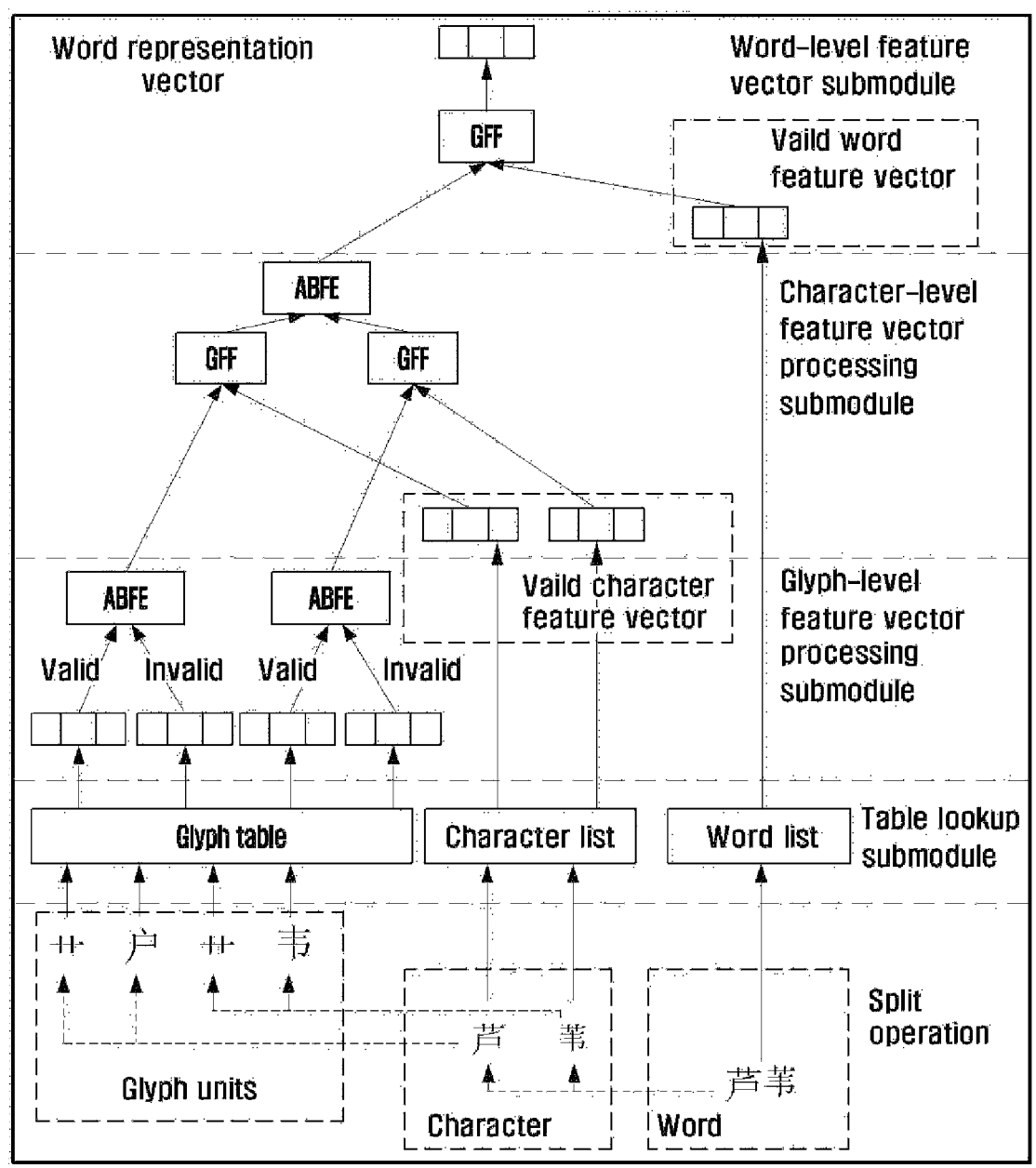
FIG. 16 illustrates a schematic flowchart of a method for determining a word representation vector according to an embodiment of the present disclosure.

In an example, as shown in FIG. 16, taking the processing of "芦苇" as an example, the method for determining a word representation vector provided by this disclosure may include the following steps.

1) The word "芦苇" is split into "芦" and "苇", and the characters "芦" and "苇" are respectively split to a set of glyph units, where the character "芦" is split into "艹" and "户", the character "苇" is split into "艹" and "㐅";

2) It may look up the glyph unit feature vector corresponding to a glyph unit in the set of glyph units. Taking the glyph units "艹" and "丿" of the character "芦" as an example, it may look up the glyph unit feature vector of "艹" and the glyph unit feature vector of "丿"; the glyph unit "艹" contains valid semantic information—it indicates that the word describes a herbaceous plant. Therefore, the table lookup submodule may output valid the glyph unit feature vectors, and these feature vectors contain information related to the meaning of words;

3) The ABFE is used to generate the extracted character-level feature vectors corresponding to two characters "芦" and "苇" from the glyph units that constitute "芦" and "苇"; since "艹" is more related to the meaning of the word, the weight of "艹" is the largest in the weighted summation. Thus, the extracted character-level feature vectors mainly contain information related to the glyph unit "艹"; the character-level feature vectors corresponding to the two glyph units "户" and "㐅" shown in the figure are invalid, that is, the semantics of "户" and "㐅" are not closely related to herbaceous plants, that is, they contain less valid semantic information, or no valid semantic information at all;

4) The weights are adjusted based on GFF, and the proportion of the extracted character-level feature vector and character feature vectors in the fusion is adjusted. The characters "芦" and "苇" themselves also contain the meaning of "plant". The fused character-level feature vector compatibly contains both information of the extracted character-level feature vector and the character feature vector, and mainly contains information related to "plant";

5) The ABFF is used to generate the extracted word-level feature vector corresponding to "芦苇" from the fused character-level feature vector corresponding to the characters "芦" and "苇". The extracted word-level feature vector mainly contains information related to the glyph unit "plant";

6) Since the word "芦苇" itself contains the information of "plant", the word feature vector obtained by the table lookup operation is also valid, and the weights may be adjusted based on GFF so that the fused word-level feature vector compatibly contains the extracted word-level feature vector and word feature vectors, and it may obtain valid semantic information—that is, the word describes a herbaceous plant;

7) The word representation vector generated by the hierarchical word representation module generates a context vector; the output layer uses the feedforward neural network to calculate the probability of the word in the word list appearing in the next position based on the context vector and then predict the word at the next position.

In the above example, if the word itself or the character itself has valid semantic information, when the weighted sum of the first character feature vector and the second character feature vector, or the weighted sum of the first word feature vector and the second word feature vector is obtained, it may retain the semantic information contained in the word itself or the character itself, and the resulting word representation vector can have more rich semantic information through combining with the semantic information in the glyph unit, thereby further improve the accuracy of determining the word representation vector The above method of determining a word representation vector can be applied not only to hieroglyphics, such as Chinese, but also to non-hieroglyphics that can be split into basic units (e.g., glyph units or letters), such as Latin. The above HWR method can also be used in the Latin language model, which can further split Latin words into byte pair encoding (BPE) segments. BPE is a compression algorithm, which may split words into word segments, the word level and the word fragment level split by the BPE split are regarded as two levels of words used in the HWR method, and then the above HWR method processes Latin words. Compared with charCNN, most of the functions are valid, and by doing so, the semantics of the words can be obtained more accurately, and the word representation vector of the words can be determined. Where, the word segment level split by the BPE is similar to the glyph unit level mentioned above, and the word level is similar to the character level or word level mentioned above.

Figure 17A:
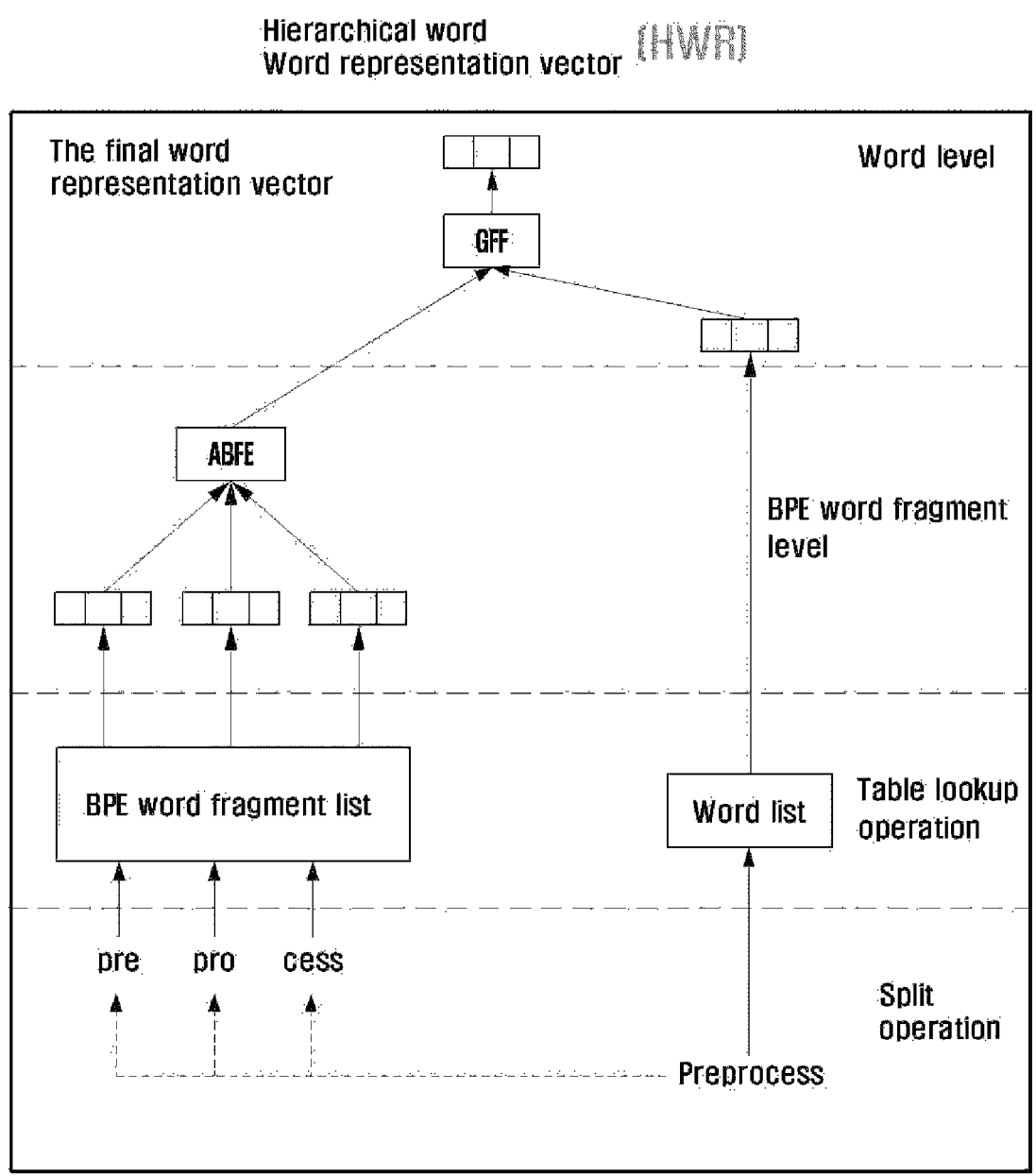
FIG. 17A illustrates a schematic diagram of a solution for determining a word representation vector for a Latin word according to an embodiment of the present disclosure.

Taking English in Latin as an example, as shown in FIG. 17A, first, the English word "preprocess" is split to get three BPE word fragments of pre, pro, and cess; then the table lookup operation is performed to look up the BPE word segment feature vector corresponding to the BPE word segment in the BPE word fragment table, and look up the first word feature vector corresponding to the word in the word list. It may use the ABFE method to determine the second word feature vector of "preprocess" based on the BPE word segment feature vectors of pre, pro and cess, and then use the GFF to fuse the first word feature vector and the second word feature vector to get the final word representation vector.

In order to better understand the application scenario of the above method for determining a word representation vector, the following describes the application process of the method for determining a word representation vector of the present disclosure in detail.

Figure 17B:
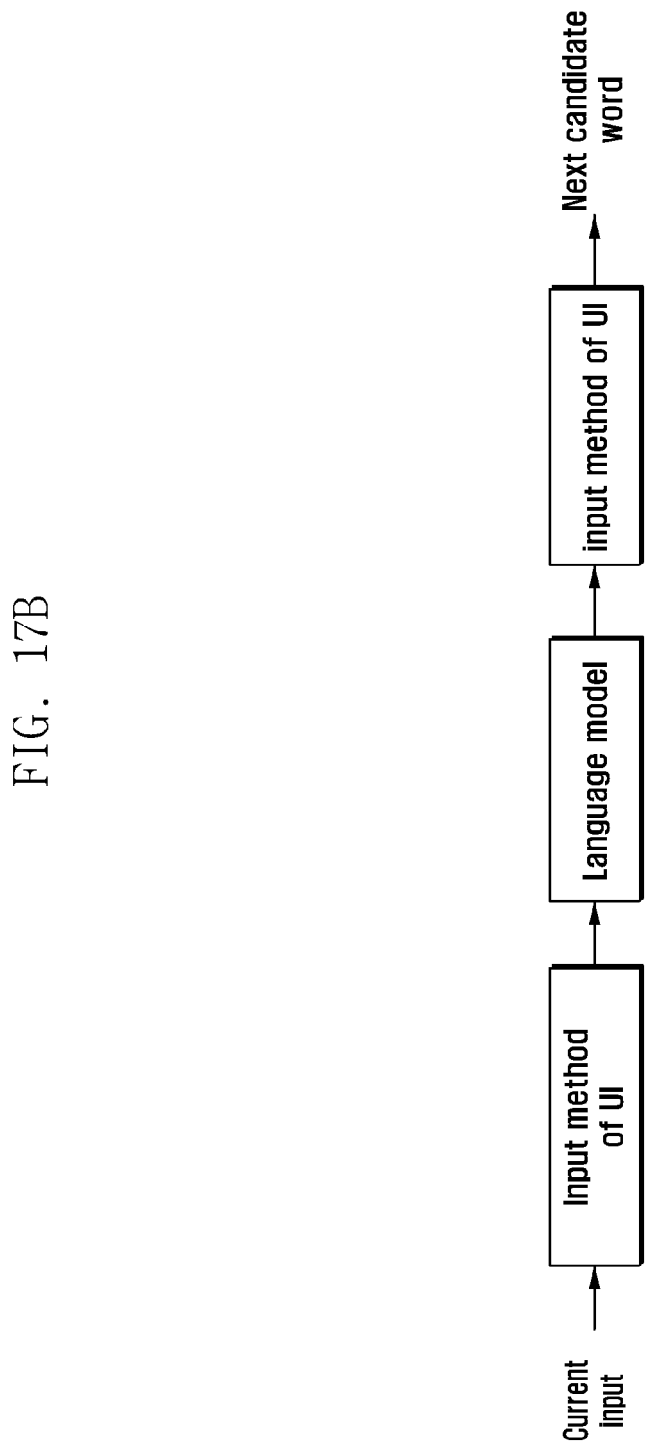
FIG. 17B illustrates a schematic flow chart of applying the method for determining a word representation vector into an input method according to an embodiment of the present disclosure.

Taking the application in the input method as an example, as shown in FIG. 17B, the method for determining the word representation vector may include the following steps.

Figure 18:
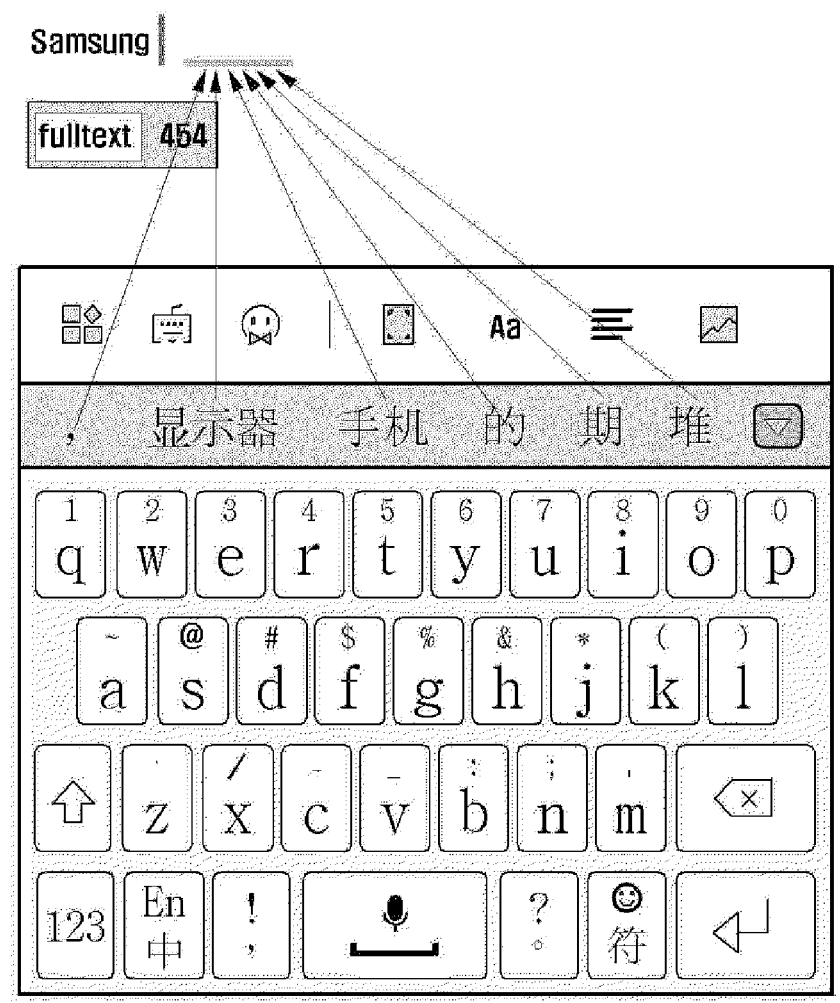
FIG. 18 illustrates an interface schematic diagram of applying the method for determining a word representation vector into an input method according to an embodiment of the present disclosure.

First, the input method of user interface (UI) obtains the current input of the user, as shown in FIG. 18, for example, "Samsung", and sends the input to the language model; then, the language model may use the previous introduced the method of determining the word representation vector in the present disclosure to process the current input, such as a sequence of words in turn to get the corresponding word representation, use the encoder to encode it, send it to the output layer, predict the word that may appear in the next position of the sequence, and rank them based on the probability, such as ",", "显示器 (displayer)", "手机 (mobile phone)", "的 (of)", "期 (period)", and "堆 (stack)" in sequence, and then return the result to the UI, which displays the next word candidates.

In the process of determining the word representation vector, this example may use the ABFE to obtain the second character feature vector and the second word feature vector, and use the GFF to adjust the weight of the first character feature vector and the second character feature vector, and use the GFF to adjust the weight of the first word feature vector and the second word feature vector, thereby improve the accuracy of determining the word representation vector. In order to verify the effect of determining the word representation vector of this disclosure, the Chinese evolved from the hieroglyphics is tested.

1. This disclosure uses more than 6 million sentences from network news and 30 books to train the above device and uses about 20,000 sentences to test the device. The source of the tested sentences is the same as the source of the trained sentence.

The test results are shown in the following table:

TABLE 1

|  | Perplexity | word similarity |
|---|---|---|
| existing method | 241.91 | 31.1208 |
| present disclosure | 231.83 | 50.8317 |

Wherein: perplexity is a metric for measuring the accuracy of the language model. The lower the perplexity, the more accurate the language model; the word similarity is a metric for measuring quality of the word representation. The higher the word similarity, the more accurate the predicted semantics of the word. 2. Three commonly used sentences are selected for testing, and then the scene predicted by the next word is selected for testing. This is the basic requirement for the input method and is closely related to the user experience. A language model is a new language model of the present disclosure, and the other is the original language model. Their performances are compared to find out which one is more convenient and faster.

It may use the following three commonly used sentences for testing:

Sentence 1: Let's go and see it together (我们一起去看看吧);

Sentence 2: There is a building in the distance (远处有一栋大楼);

Sentence 3: Now the time is very tight (现在时间非常紧迫).

TABLE 2

|  | The time required to input a sentence in an existing language model | The time required to input a sentence in a language model of the present disclosure |
|---|---|---|
| sentence 1 | 20 s | 9 s |
| sentence 2 | 17 s | 10 s |
| sentence 3 | 20 s | 8 s |
| total time | 57 s | 27 s |

Figure 19:
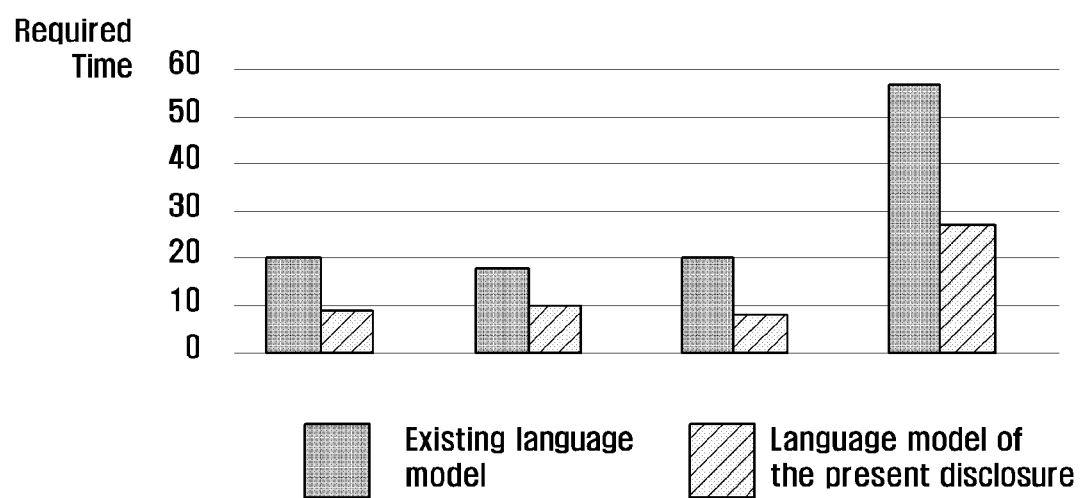
FIG. 19 illustrates a comparison diagram that shows a first performance result of the method for determining a word representation vector according to an embodiment of the present disclosure, in comparison with a related language model.

With reference to Table 2 and FIG. 19, shorter typing time means that the language model can speed up typing. For a sentence, it requires less time for typing by using the language model of this disclosure. Compared with the existing language model, the language model of this disclosure reduces the typing time by 52.63% in total. In other words, typing becomes faster.

TABLE 3

|  | The number of clicks required to input a sentence in an existing language model | The number of clicks required to input a sentence in a language model of the present disclosure |
|---|---|---|
| sentence 1 | 24 | 10 |
| sentence 2 | 25 | 17 |
| sentence 3 | 31 | 18 |
| total number | 80 | 45 |

Figure 20:
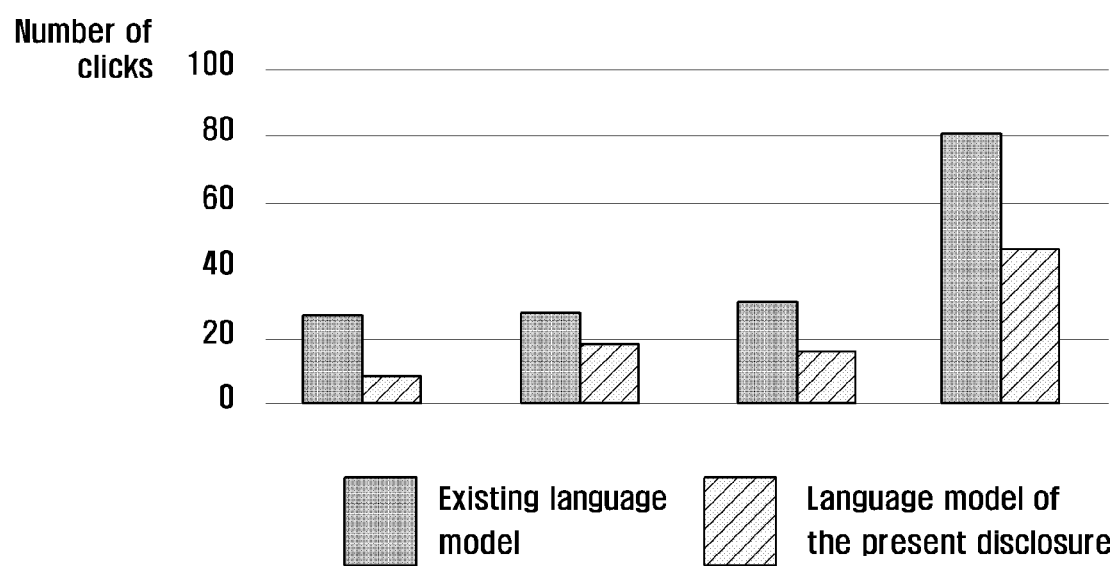
FIG. 20 illustrates a comparison diagram that shows a second performance result of the method for determining a word representation vector according to an embodiment of the present disclosure, in comparison with the related language model.

With reference to Table 3 and FIG. 20, the reduction in the number of clicks means that the language model makes input more convenient. By using the language model of this disclosure, fewer number of clicks are required to input sentences. Compared with the existing language model, the language model according to an embodiment reduces the number of clicks by 43.75% in total. In other words, typing becomes more convenient.

The language model in an embodiment uses a hierarchical word representation module to create higher quality of word representation vectors, so the language model of this embodiment may provide a more accurate probability for a word in a sentence. Therefore, the input method supported by the language model of the present disclosure may provide a more accurate prediction of the next word.

For sentence 1, sentence 2, and sentence 3, the language model according to an embodiment will predict the next word that will be typed by the user and provide it directly to the user. Therefore, the user does not have to type every word. Therefore, compared with the existing language model, the language model of the present embodiment may make typing faster and more convenient.

The advantages of embodiments of the present disclosure are as follows.

1. For hieroglyphic languages such as Chinese, the language model that uses a hierarchical word representation module in an embodiment has a lower level of perplexity than other existing language models.

2. For WBVs composed of CBVs, although the words and characters are not included in the word list and character list, since the language model in an embodiment introduces the information of the glyph unit, the word representation vectors generated by the word representation module still contain useful semantic information.

3. For hieroglyphic languages such as Chinese, the word representation vector generated by the hierarchical word representation module in the language model has higher quality than the word representation vector generated by the word representation module of the existing method.

The above embodiment introduces the method of determining the word representation vector from the perspective of the method flow. The following introduces it from the perspective of the virtual module.

Figure 21:
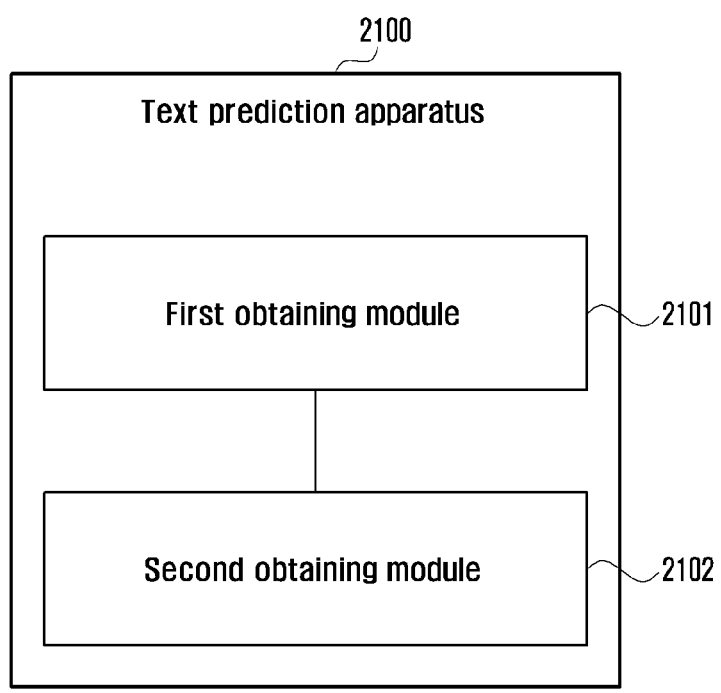
FIG. 21 illustrates a schematic structural diagram of an apparatus for determining a word representation vector according to an embodiment of the present disclosure.

An embodiment of the present disclosure provides an apparatus 2600 for determining a word representation vector. As shown in FIG. 21, the apparatus 2600 may include a first obtaining module 2101 and a second obtaining module 2102. The first obtaining module 2101 and the second obtaining module 2102 may be implemented as hardware modules, and/or software modules. If the first obtaining module 2101 and the second obtaining module 2102 are implemented as software modules, they may be stored as series of instructions in a memory (e.g. a memory 2203 of FIG. 22), and upon executed these instructions cause a processor (e.g. a processor 2701 of FIG. 22) to perform the operations of the first obtaining module 2101 and the second obtaining module 2102, respectively.

The first obtaining module 2101 is configured to obtain a set of glyph units of at least one word.

The second obtaining module 2102 is configured to obtain a word representation vector of the at least one word based on the set of glyph units.

The above apparatus for determining the word representation vector may obtain a context vector from the set of glyph units of the text, and then predict the next word of the text based on the context vector; and it can effectively obtain a corresponding set of glyph units even for hieroglyphics in which hyperbolic characters are prone to appear or languages evolved from the hieroglyphics, thereby improving an accuracy of determining the word representation vector.

In an implementation of the embodiment of the present disclosure, when the first obtaining module 2101 obtains the set of glyph units of at least one word in the text, it is configured to: split the at least one word to get at least one character; split at least one character to get at least one glyph unit; and obtain the set of glyph units based on the at least one glyph unit.

In an implementation of the embodiment of the present disclosure, when the second obtaining module 2102 obtains the word representation vector of the at least one word based on the set of glyph units, it is configured to: obtain a glyph unit feature vector of the set of glyph units; and obtain a word representation vector of the at least one word based on the glyph unit feature vector.

In an implementation of the embodiment of the present disclosure, when the second obtaining module 2102 obtains the word representation vector of the at least one word based on the glyph unit feature vector, it is configured to: obtain a character representation vector corresponding to at least one character in the at least one word based on the glyph unit feature vector; and obtain the word representation vector of the at least one word based on the character representation vector corresponding to at least one character of the at least one word.

In an implementation of the embodiment of the present disclosure, when the second obtaining module 2102 obtains the character representation vector corresponding to at least one character in the at least one word based on the glyph unit feature vector, it is configured to: obtain a first character feature vector of at least one character in the at least one word; obtain a second character feature vector corresponding to at least one character in the at least one word based on the glyph unit feature vector; and obtain the character representation vector corresponding to the at least one character based on the first character feature vector and the second character feature vector.

In an implementation of the embodiment of the present disclosure, when the second obtaining module 2102 obtains the first character feature vector of at least one character in the at least one word, it is configured to: look up the first character feature vector corresponding to at least one character in the at least one word; and set a preset character feature vector as the first character feature vector when the corresponding first character feature vector is not found.

In an implementation of the embodiment of the present disclosure, when the second obtaining module 2102 obtains the word representation vector of the at least one word based on the character representation vector corresponding to at least one character of the at least one word, it is configured to: obtain a first word feature vector of the at least one word; obtain a second word feature vector of the at least one word based on the character representation vector corresponding to the at least one character; and obtain the word representation vector of the at least one word based on the first word feature vector and the second word feature vector.

In an implementation of the embodiment of the present disclosure, when the second obtaining module 2102 obtains the first word representation vector of the at least one word, it is configured to: look up the first word feature vector corresponding to the at least one word; and set a preset word feature vector as the first word feature vector when the corresponding first word feature vector is not found.

In an implementation of the embodiment of the present disclosure, when the second obtaining module 2102 obtains the second character feature vector corresponding to at least one character in the at least one word based on the glyph unit feature vector, it is configured to: determine weight coefficient of the glyph unit corresponding to at least one character in the at least one word; and obtain a corresponding second character feature vector based on the determined weight coefficient of the glyph unit and the corresponding glyph unit feature vector.

In an implementation of the embodiment of the present disclosure, when the second obtaining module 2102 determines the weight coefficient of the glyph unit corresponding to at least one character in the at least one word, it is configured to: determine an inner product of the glyph unit feature vector of the glyph unit of at least one character and the first character feature vector of the corresponding character to get an initial glyph unit weight of the glyph unit; and determine the glyph unit weight coefficient of the corresponding glyph unit based on the initial glyph unit weight.

In an implementation of the embodiment of the present disclosure, when the second obtaining module 2102 obtains the character representation vector corresponding to the at least one character based on the first character feature vector and the second character feature vector, it is configured to: perform linear mapping calculation on the first character feature vector to get a first character weight coefficient of the first character feature vector; obtain a second character weight coefficient of the second character feature vector based on the first character weight coefficient; and obtain a character representation vector of the corresponding character based on the first character weight coefficient, the first character feature vector, the second character weight coefficient, and the second character feature vector.

In an implementation of the embodiment of the present disclosure, when the second obtaining module 2102 obtains the second word feature vector of the at least one word based on the character representation vector corresponding to the at least one character, it is configured to: determine an inner product of a character representation vector of at least one character in at least one word and the first character feature vector of the corresponding word to get an initial character weight of at least one character; obtain character weight coefficient of at least one character based on the initial character weight; and obtain the second word feature vector of the corresponding word based on the character weight coefficient of at least one character and the corresponding character representation vector.

In an implementation of the embodiment of the present disclosure, when the second obtaining module 2102 obtains the word representation vector of the at least one word based on the first word feature vector and the second word feature vector, it is configured to: perform linear mapping calculation on the first word feature vector to get a first word weight coefficient of the first word feature vector; obtain a second word weight coefficient of the second word feature vector based on the first word weight coefficient; and obtain the word representation vector of the corresponding word based on the first word weight coefficient, the first word feature vector, the second word weight coefficient, and the second word feature vector.

The apparatus for determining a word representation vector of a picture in an embodiment of the present disclosure may perform a method for determining a word representation vector of a picture provided in an embodiment of the present disclosure, and its implementation principle is similar the previously mentioned. The module of apparatus for determining a word representation vector of a picture in an embodiment of the present disclosure may perform actions that correspond to the steps of a method for determining a word representation vector of a picture provided in an embodiment of the present disclosure. For detailed function description, it may refer to the description in the method of determining the word representation vector of the corresponding picture shown in the foregoing, which will not be repeated here.

The apparatus for determining the word representation vector provided by the embodiment of the present disclosure is introduced from the perspective of a functional module. Next, an electronic device provided by the embodiment of the present disclosure will be introduced from the perspective of physical realization of the hardware, and meanwhile, the calculation system of the electronic device is introduced.

Based on the same principle as the method shown in the embodiments of the present disclosure, an embodiment of the present disclosure also provides an electronic device, the electronic device may include but is not limited to: a processor and a memory; the memory is configured to store a computer operation instruction; the processor is configured to execute the method for determining the word representation vector shown in the embodiment by invoking the computer operation instruction. Compared with the prior art, the method for determining the word representation vector of the present disclosure can effectively obtain a corresponding set of glyph units even for hieroglyphics in which hyperbolic characters are prone to appear or languages evolved from the hieroglyphics, thereby improving an accuracy of determining the word representation vector.

Figure 22:
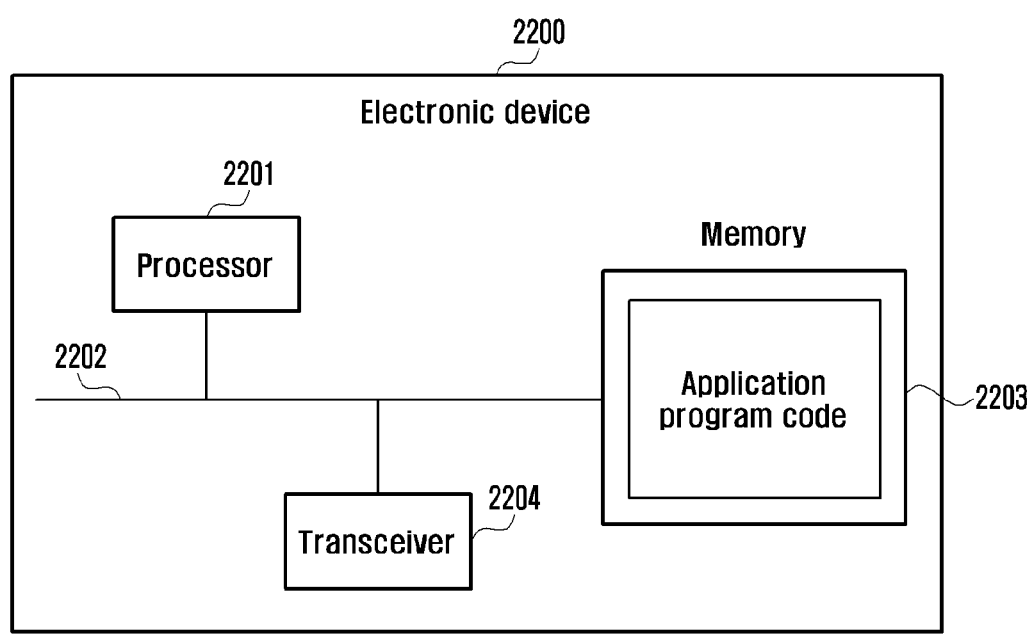
FIG. 22 illustrates a schematic structural diagram of an electronic device according to an embodiment of the present disclosure.

In an alternative embodiment, an electronic device is provided. As shown in FIG. 22, the electronic device 2200 may include a processor 2201 and a memory 2203. The processor 2201 is connected to the memory 2203, for example, via the bus 2202. Alternatively, the electronic device 2200 may further include a transceiver 2204. It should be noted that in practical disclosures, the number of transceivers 2204 is not limited to one, and the structure of the electronic device 2200 does not limit the embodiments of the present disclosure.

The processor 2201 may be a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. It is possible to implement or execute the various exemplary logical blocks, modules and circuits described in combination with the disclosures of the present disclosure. The processor 2201 may also be a combination of computing functions, such as a combination of one or more microprocessors, a combination of a DSP and a microprocessor, and so on.

The bus 2202 may include a path for communicating information between the above components. The bus 2202 may be a peripheral component interconnect (PCI) bus or an extended industry standard architecture (EISA) bus. The bus 2202 may be divided into an address bus, a data bus, a control bus, and so on. For the sake of presentation, FIG. 22 only uses one thick line to represent the bus, but it does not mean that there is only one bus or one type of bus.

The memory 2203 may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program code in the form of instructions or data structures and can be accessed by a computer, but not limited to this.

The memory 2203 is used to store application program code that, when executed by the processor 2201, implements the solution of the present disclosure. The processor 2201 is configured to execute application program code stored in the memory 2203 to implement the content shown in any of the foregoing method embodiments.

Wherein, the electronic device in the embodiment of the present disclosure may include, but is not limited to, a mobile terminal, such as a mobile phone, a notebook computer, a digital broadcast receiver, a personal digital assistant (PDA), a portable android device (PAD), a portable multimedia player (PMP), an in-vehicle terminal (for example, a car navigation terminal) and the like, as well as a fixed terminal such as digital TV, a desktop computer and the like. The electronic device shown in the FIG. 22 is merely an example, and then should not construct any limitation on the function and scope of use of the embodiments of the present disclosure.

Embodiments of the present disclosure provide a computer-readable storage medium on which a computer program is stored, and when the computer program is executed on a computer, it enables the computer to execute the corresponding content in the foregoing method embodiments. Compared with the prior art, the method for determining the word representation vector of the present disclosure can effectively obtain a corresponding set of glyph units even for hieroglyphics in which hyperbolic characters are prone to appear or languages evolved from the hieroglyphics, thereby improving an accuracy of determining the word representation vector.

It should be understood although each step in the flowchart of the drawings are sequentially shown as the arrows, these steps are not necessarily performed in the order indicated by the arrows. Unless otherwise expressly stated herein, the implementation of these steps is not strictly limited in the order, and they may be performed in other orders. Moreover, at least some of the steps in the flowchart of the drawings may include a plurality of sub-steps or stages, and the plurality of sub-steps or stages are not necessarily performed at the same time, but may be performed at different times, and the plurality of sub-steps or stage are not necessary to be performed sequentially, but may be performed alternately with at least a portion of other steps or sub-steps or stages of other steps.

It should be noted that the above computer readable medium of the present disclosure may be a computer readable signal medium or a computer readable storage medium or any combination of the above two. The computer readable storage medium may be, for example, but is not limited to, an electronic, magnetic, optical, electromagnetic, infrared, or semiconductor system, apparatus, or device, or any combination of the above. More specific examples of the computer readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that may contain or store programs, which may be used by or in connection with an instruction execution system, apparatus, or device. In the present disclosure, a computer readable signal medium may include a data signal that is propagated in the baseband or propagated as part of a carrier, carrying computer readable program codes. Such propagated data signals may take various forms, which includes, but is not limited to, electromagnetic signals, optical signals, or any suitable combination of the above. The computer readable signal medium may also be any computer readable medium except for a computer readable storage medium, and the computer readable signal medium may transmit, propagate or transport a program for use by or in connection with an instruction execution system, apparatus or device. Program codes contained on the computer readable medium may be transmitted by any suitable medium, which includes but is not limited to, wire, fiber optic cable, radio frequency (RF), and the like, or any suitable combination of the above.

The above computer readable medium may be contained in the above electronic device; or may be separately present and is not incorporated in the electronic device.

The computer readable medium carries one or more programs, when the one or more programs are executed by the electronic device, causing the electronic device to execute the method shown in the foregoing embodiment.

The computer program codes for executing the operations of the present disclosure may be written in one or more programming languages, or combinations thereof, wherein the programming languages includes an object-oriented programming language such as Java, Smalltalk, C++, and also includes conventional procedural programming language— such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The modules described in the embodiments of the present disclosure may be implemented in software or hardware. In some cases, the name of the module does not constitute a limitation on the module itself. For example, the prediction module can also be described as "a module for predicting the next word".

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for inputting text on an electronic device, the method comprising:
   displaying a user interface including a virtual keyboard, a suggestion area, and an input field;
   obtaining at least one word from a user input that is received through the virtual keyboard;
   inputting the at least one word into a language model that performs:
      splitting the at least one word into at least one character;
      obtaining glyph units of the at least one word by splitting the at least one character into the glyph units;
      obtaining a word representation vector of the at least one word based on a word-level feature vector of the at least one word, a character-level feature vector of the at least one character, and glyph-level features vectors of the glyph units; and
      providing a predictive word or a predictive character corresponding to the word representation vector;
   outputting the predictive word or the predictive character from the language model;
   displaying the predictive word or the predictive character in the suggestion area of the user interface; and
   based on the predictive word or the predictive character being selected from the suggestion area, displaying the predictive word or the predictive character in the input field of the user interface,
   wherein the obtaining the word representation vector of the at least one word comprises:
      obtaining the character-level feature vector by obtaining lookup table glyph-level features vectors and a lookup table character-level feature vector from a lookup table, applying an attention-based feature extraction method to the lookup table glyph-level features vectors to obtain an extracted character-level feature vector, and fusing the lookup table character-level feature vector with the extracted character-level feature vector to obtain the character-level feature vector.

2. The method according to claim 1, wherein the obtaining the word representation vector of the at least one word comprises:
   obtaining the character-level feature vector corresponding to the at least one character in the at least one word based on the glyph-level features vectors; and
   obtaining the word representation vector of the at least one word based on the character-level feature vector corresponding to the at least one character of the at least one word.

3. The method according to claim 2, wherein the obtaining the character-level feature vector comprises:
   obtaining a first character feature vector of the at least one character in the at least one word;
   obtaining a second character feature vector corresponding to the at least one character in the at least one word based on the glyph-level features vectors; and
   obtaining the character-level feature vector corresponding to the at least one character based on the first character feature vector and the second character feature vector.

4. The method according to claim 3, wherein the obtaining the first character feature vector comprises:
   looking up the first character feature vector corresponding to the at least one character in the at least one word; and
   setting the first character feature vector to a preset character feature vector when the first character feature vector corresponding to the at least one character is not found in a vocabulary database.

5. The method according to claim 4, wherein the obtaining the word representation vector of the at least one word comprises:
   obtaining a first word feature vector of the at least one word;
   obtaining a second word feature vector of the at least one word based on the character-level feature vector corresponding to the at least one character; and
   obtaining the word representation vector of the at least one word based on the first word feature vector and the second word feature vector.

6. The method according to claim 5, wherein the obtaining the first word representation vector of the at least one word comprises:
   looking up the first word feature vector corresponding to the at least one word; and setting the first word feature vector to a preset word feature vector when the first word feature vector corresponding to the at least one character is not found in the vocabulary database.

7. The method according to claim 6, wherein the obtaining the second character feature vector comprises:
    determining weight coefficients of the glyph units corresponding to the at least one character in the at least one word; and
    obtaining the second character feature vector based on the weight coefficients of the glyph units and the glyph-level features vectors corresponding to the at least one character in the at least one word.

8. The method according to claim 7, wherein the determining the weight coefficients of the glyph units corresponding to the at least one character in the at least one word comprises:
    determining an inner product of the glyph-level features vectors and the first character feature vector to obtain initial glyph unit weights of the glyph units; and
    determining glyph unit weight coefficients of the glyph units of the at least one character based on the initial glyph unit weights.

9. The method according to claim 8, wherein the obtaining the character-level feature vector corresponding to the at least one character based on the first character feature vector and the second character feature vector comprises:
    performing linear mapping calculation on the first character feature vector to obtain a first character weight coefficient of the first character feature vector;
    obtaining a second character weight coefficient of the second character feature vector based on the first character weight coefficient; and
    obtaining the character-level feature vector of the at least one character based on the first character weight coefficient, the first character feature vector, the second character weight coefficient, and the second character feature vector.

10. The method according to claim 9, wherein the obtaining the second word feature vector of the at least one word based on the character-level feature vector corresponding to the at least one character comprises:
    determining an inner product of the character-level feature vector of the at least one character in the at least one word and the first character feature vector to obtain an initial character weight of the at least one character;
    obtaining a character weight coefficient of the at least one character based on the initial character weight; and
    obtaining the second word feature vector of the at least one word based on the character weight coefficient of at least one character and the character-level feature vector.

11. The method according to claim 10, wherein the obtaining the word representation vector of the at least one word based on the first word feature vector and the second word feature vector comprises:
    performing linear mapping calculation on the first word feature vector to obtain a first word weight coefficient of the first word feature vector;
    obtaining a second word weight coefficient of the second word feature vector based on the first word weight coefficient; and
    obtaining the word representation vector of the at least one word based on the first word weight coefficient, the first word feature vector, the second word weight coefficient, and the second word feature vector.

12. The method according to claim 1, wherein the obtaining the word representation vector comprises:
    obtaining a lookup table word-level feature vector of the at least one word, the lookup table character-level feature vector of the at least one character, and the lookup table glyph-level features vectors of the glyph units using the lookup table,
    applying the attention-based feature extraction method to the lookup table glyph-level features vectors to obtain the extracted character-level feature vector,
    fusing the lookup table character-level feature vector with the extracted character-level feature vector to obtain a fused character-level feature vector,
    applying the attention-based feature extraction method to the fused character-level feature vector to obtain an extracted word-level feature vector, and
    fusing the extracted word-level feature vector with the lookup table word-level feature vector to obtain the word representation vector.

13. An electronic device, comprising:
    a memory configured to store instructions;
    a display configured to display a user interface including a virtual keyboard, a suggestion area, and an input field; and
    a processor configured to execute the instructions to:
        obtain at least one word from a user input that is received through the virtual keyboard;
        inputting the at least one word into a language model that performs:
            splitting the at least one word into at least one character;
            obtaining glyph units of the at least one word by splitting the at least one character into the glyph units;
            obtaining a character-level feature vector by obtaining lookup table glyph-level features vectors and a lookup table character-level feature vector from a lookup table, applying an attention-based feature extraction method to the lookup table glyph-level features vectors to obtain an extracted character-level feature vector, and fusing the lookup table character-level feature vector with the extracted character-level feature vector to obtain the character-level feature vector;
            obtaining a word representation vector of the at least one word based on a word-level feature vector of the at least one word, the character-level feature vector of the at least one character, and glyph-level features vectors of the glyph units;
            providing a predictive word or a predictive character corresponding to the word representation vector; and
            outputting the predictive word or a predictive character from the language model;
        controlling the user interface to display the predictive word or the predictive character in the suggestion area of the user interface; and
        based on the predictive word or the predictive character being selected from the suggestion area, controlling the user interface to display the predictive word or the predictive character in the input field of the user interface.

14. The electronic device of claim 13, wherein the processor is further configured to:
    obtain a first character feature vector of the at least one character in the at least one word;

obtain a second character feature vector corresponding to the at least one character in the at least one word based on the glyph-level features vectors; and obtain the character-level feature vector corresponding to the at least one character based on the first character feature vector and the second character feature vector.

15. The electronic device of claim 14, wherein the processor is further configured to:

obtain a first word feature vector and a second word feature vector of the at least one word based on the character-level feature vector corresponding to the at least one character; and obtain the word representation vector of the at least one word based on the first word feature vector and the second word feature vector.

16. The electronic device of claim 15, wherein the processor is further configured to:

set the first word feature vector to a preset word feature vector when the first word feature vector corresponding to the at least one character is not found in a vocabulary database;

determine weight coefficients of the glyph units corresponding to the at least one character in the at least one word; and obtain the second character feature vector based on the weight coefficients of the glyph units and the glyph-level features vectors corresponding to the at least one character in the at least one word.

17. The electronic device of claim 16, wherein the processor is further configured to:

determine an inner product of the glyph-level features vectors and the first character feature vector to obtain an initial glyph unit weights of the glyph units; and determine glyph unit weight coefficients of the glyph units of the at least one character based on the initial glyph unit weights.

18. A non-transitory computer-readable storage medium storing a program that is executable by one or more processor to perform a method for inputting text on an electronic device, the method comprising:

displaying a user interface including a virtual keyboard, a suggestion area, and an input field;

obtaining at least one word from a user input that is received through the virtual keyboard;

inputting the at least one word into a language model that performs:

splitting the at least one word into at least one character;

obtaining glyph units of the at least one word by splitting the at least one character into the glyph units;

obtaining a word representation vector of the at least one word based on a word-level feature vector of the at least one word, a character-level feature vector of the at least one character, and glyph-level features vectors of the glyph units; and providing a predictive word or a predictive character corresponding to the word representation vector, outputting the predictive word or a predictive character from the language model;

displaying the predictive word or the predictive character in the suggestion area of the user interface; and based on the predictive word or the predictive character being selected from the suggestion area, displaying the predictive word or the predictive character in the input field of the user interface, wherein the obtaining the word representation vector of the at least one word comprises:

obtaining the character-level feature vector by obtaining lookup table glyph-level features vectors and a lookup table character-level feature vector from a lookup table, applying an attention-based feature extraction method to the lookup table glyph-level features vectors to obtain an extracted character-level feature vector, and fusing the lookup table character-level feature vector with the extracted character-level feature vector to obtain the character-level feature vector.

* * * * *